(12) United States Patent
Preuss et al.

(10) Patent No.: US 6,590,889 B1
(45) Date of Patent: Jul. 8, 2003

(54) DATA COMMUNICATIONS SYSTEM AND HYBRID TIME-CODE MULTIPLEXING METHOD

(75) Inventors: Robert David Preuss, Boston, MA (US); Marcos Antonio Bergamo, Wellesley, MA (US)

(73) Assignee: GTE Internetworking Incorporated, Cambridge, MA (US)

( * ) Notice: Subject to any disclaimer, the term of this patent is extended or adjusted under 35 U.S.C. 154(b) by 0 days.

(21) Appl. No.: 09/261,971

(22) Filed: Mar. 3, 1999

Related U.S. Application Data

(63) Continuation-in-part of application No. 08/909,266, filed on Aug. 11, 1997.

(51) Int. Cl.$^7$ .............................................. H04B 7/216
(52) U.S. Cl. ...................... 370/342; 370/335; 370/441; 370/392; 370/419; 370/321; 375/145; 375/257; 375/367
(58) Field of Search ................................. 370/342, 350, 370/320, 335, 468, 321, 392, 419, 441, 508; 455/427, 12.1; 375/145, 257, 367

(56) References Cited

U.S. PATENT DOCUMENTS

| | | | |
|---|---|---|---|
| 4,455,651 A | * 6/1984 | Baran ........................... 342/352 |
| RE32,905 E | 4/1989 | Baran ........................... 370/104 |
| 4,965,586 A | 10/1990 | O'Neill et al. ................. 342/357 |
| 5,195,090 A | 3/1993 | Bolliger et al. ............. 370/94.1 |
| 5,195,091 A | 3/1993 | Farwell et al. ............. 370/94.1 |
| 5,260,967 A | 11/1993 | Schilling ........................ 375/1 |
| 5,276,907 A | 1/1994 | Meidan ...................... 455/33.3 |
| 5,278,892 A | 1/1994 | Bolliger et al. ............... 379/60 |
| 5,305,308 A | 4/1994 | English et al. .............. 370/32.1 |
| 5,313,457 A | 5/1994 | Hostetter et al. ............. 370/18 |
| 5,375,140 A | 12/1994 | Bustamante et al. ........... 375/1 |
| 5,410,568 A | 4/1995 | Schilling ..................... 375/205 |
| 6,005,883 A | * 12/1999 | Trompower .................. 370/431 |
| 6,104,708 A | * 8/2000 | Bergamo ..................... 370/320 |
| 6,125,261 A | * 9/2000 | Anselmo et al. ............. 370/316 |
| 6,148,176 A | * 11/2000 | Kolev et al. ................ 455/12.1 |
| 6,185,246 B1 | * 2/2001 | Gilhousen ................... 370/342 |
| 6,275,480 B1 | * 8/2001 | Schreier ..................... 370/321 |
| 6,310,870 B1 | * 10/2001 | Li .............................. 370/342 |
| 6,356,555 B1 | 3/2002 | Rakib et al. ................. 370/441 |
| 6,366,609 B1 | * 4/2002 | Rossi .......................... 375/222 |

* cited by examiner

*Primary Examiner*—Edward F. Urban
*Assistant Examiner*—Marceau Milord
(74) *Attorney, Agent, or Firm*—Leonard Charles Suchyta; James K. Weixel

(57) ABSTRACT

A data communications system, particularly suited for shared or wireless communications channels, capable of accommodating terminals having different throughput capabilites by flexibly allocating cyclically rotated phases of a common code is disclosed. One or more shifts of a cyclic orthogonal code are assigned to a terminal. These codes are preferably cyclically padded to increase their tolerance to arbitrary time shifts, and the resulting codes are used to spread the signals for transmission.

67 Claims, 15 Drawing Sheets

(45°-BPSK)
m=1

4-QAM
m=2

16-QAM PUNCTURED
m=3

16-QAM
m=4

36-QAM
PUNCTURED
m=5

64-QAM
m=6

144-QAM
PUNCTURED
m=7

256-QAM
m=8

DATA COMMUNICATIONS SYSTEM AND HYBRID TIME-CODE MULTIPLEXING METHOD

RELATED APPLICATIONS

This application is a continuation-in-part of U.S. patent application Ser. No. 08/909,266, filed Aug. 11, 1997, which is hereby incorporated by reference.

BACKGROUND OF THE INVENTION

The present invention relates to digital data communications, and more particularly, to systems and methods for accommodating terminals of different throughput capabilities.

Current systems use a variety of schemes for encoding and multiplexing digital data streams for communications between terminals including frequency division multiple access (FDMA), time division multiple access (TDMA), and code division multiple access (CDMA). Some systems have also been devised which use various combinations of FDMA, TDMA, and CDMA.

One problem with known prior art systems, however, is that they do not readily accommodate terminals having different throughput capabilities in an integrated digital network. In particular, data communications systems using TDMA and satellite relay typically expect or require that all terminals interconnected in the network have similar throughput capabilities and use a common modulation. In addition, these conventional systems cannot accommodate terminals that transmit at significantly different burst rates, and thus require all the terminals to use antennas of approximately the same diameter.

Conventional communications systems using FDMA and satellite relay, or any other form of radio relay, can accommodate multiple isolated point-to-point channels of differing throughput in configurations normally referred to as stove-pipe architectures, where integrated digital networking is not practically feasible.

Conventional TDMA systems that use variable rate burst modems can accommodate channels of differing throughputs. These systems, however, inefficiently use equipment at sites with relatively large antenna diameters by requiring a large number of modems to handle communications with smaller terminals.

Conventional satellite, or any other form of radio relay, systems using CDMA typically cannot handle reception of signals at varying power levels from different terminals, a problem normally referred as the "near-far problem."

Therefore, there exists a need to overcome the above described problems of the prior art and thus permit a system that accommodates terminals of different throughput capabilities in an integrated digital network.

SUMMARY OF THE INVENTION

Accordingly, the present invention is directed to methods and systems for communicating between nodes that substantially obviates the problems of prior art communications systems.

In accordance with the purposes of the invention, as embodied and broadly described herein, the invention comprises a method for communicating over a network having a plurality of nodes. The method comprises the steps of generating a plurality of codes each being orthogonal to and a circular shifted version of every other one of the codes, assigning a subset of the codes to a first node, and transmitting information from the first node to a second node using the subset of codes.

In another aspect, the invention comprises a node for communicating over a network including means for storing a subset of codes, and means for transmitting information from a first node to a second node using the subset of codes. The subset of codes is derived from a set of codes and each code in the set of codes is orthogonal to and a circular shift of every other code in the set of codes.

In still another aspect, the invention comprises methods for modulating end-user information in symbols wherein each symbol is capable of carrying multiple bits of information.

In still another aspect, the invention comprises systems and methods for communicating between nodes using circulant-unitary matrices.

This summary of the invention and the following detailed description should not restrict the scope of the claimed invention. Both provide examples and explanations to enable others to practice the invention. The accompanying drawings, which form part of the description for carrying out a best mode of the invention, show several embodiments of the invention, and together with the description, explain the principles of the invention.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
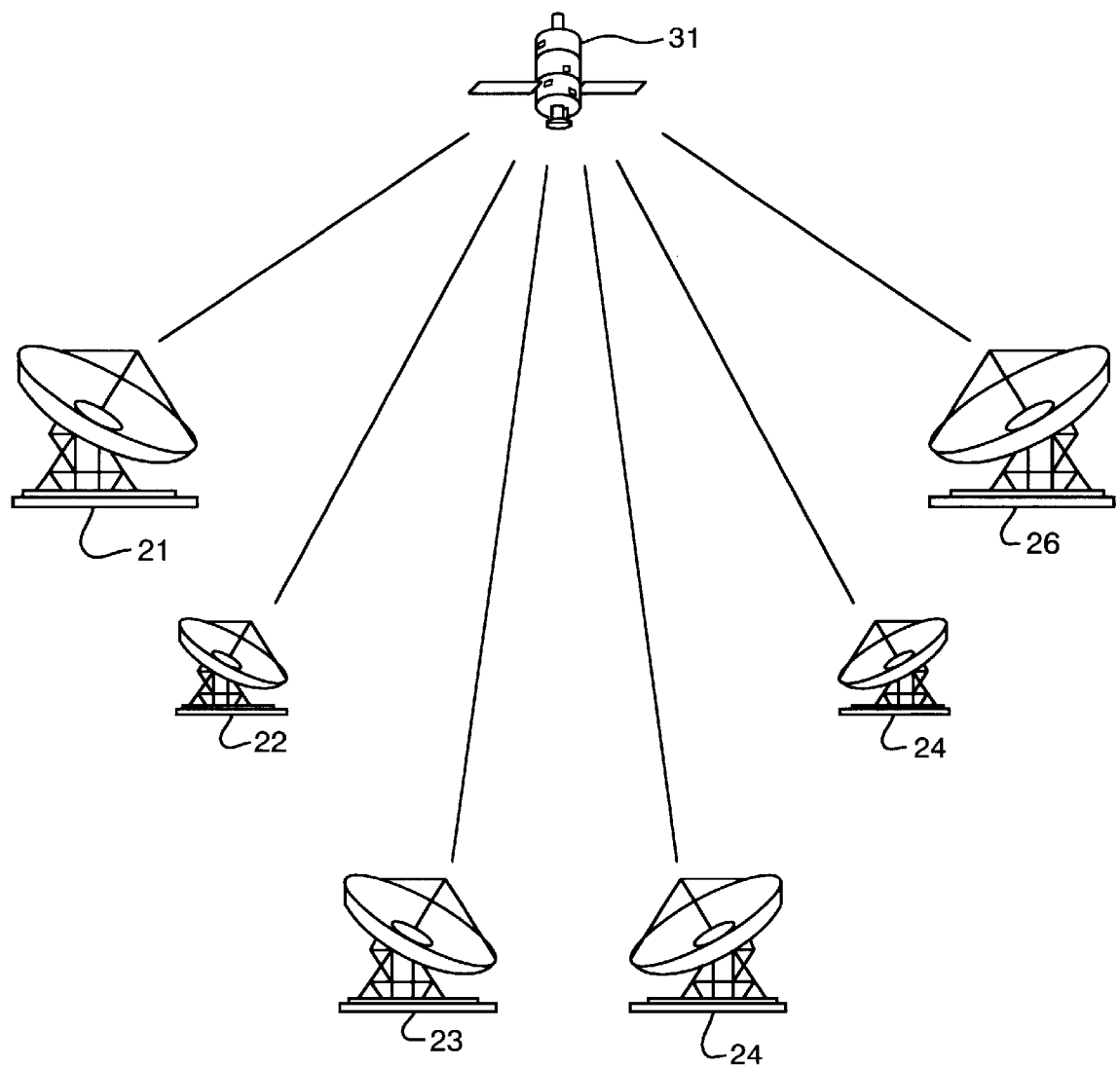
FIG. 1 is a diagram illustrating a digital network, consistent with the present invention, including a plurality of terminals communicating via a satellite relay.

FIG. 1 is a diagram of a digital network 100, including terminals 21–26 with different throughput capabilities that communicate with each other through a HUB 31. In one embodiment, HUB 31 includes a relay satellite. In this embodiment, terminals 21–26 are satellite terminals and typically include, for example, an antenna, a power amplifier, and a modem.

Figure 2:
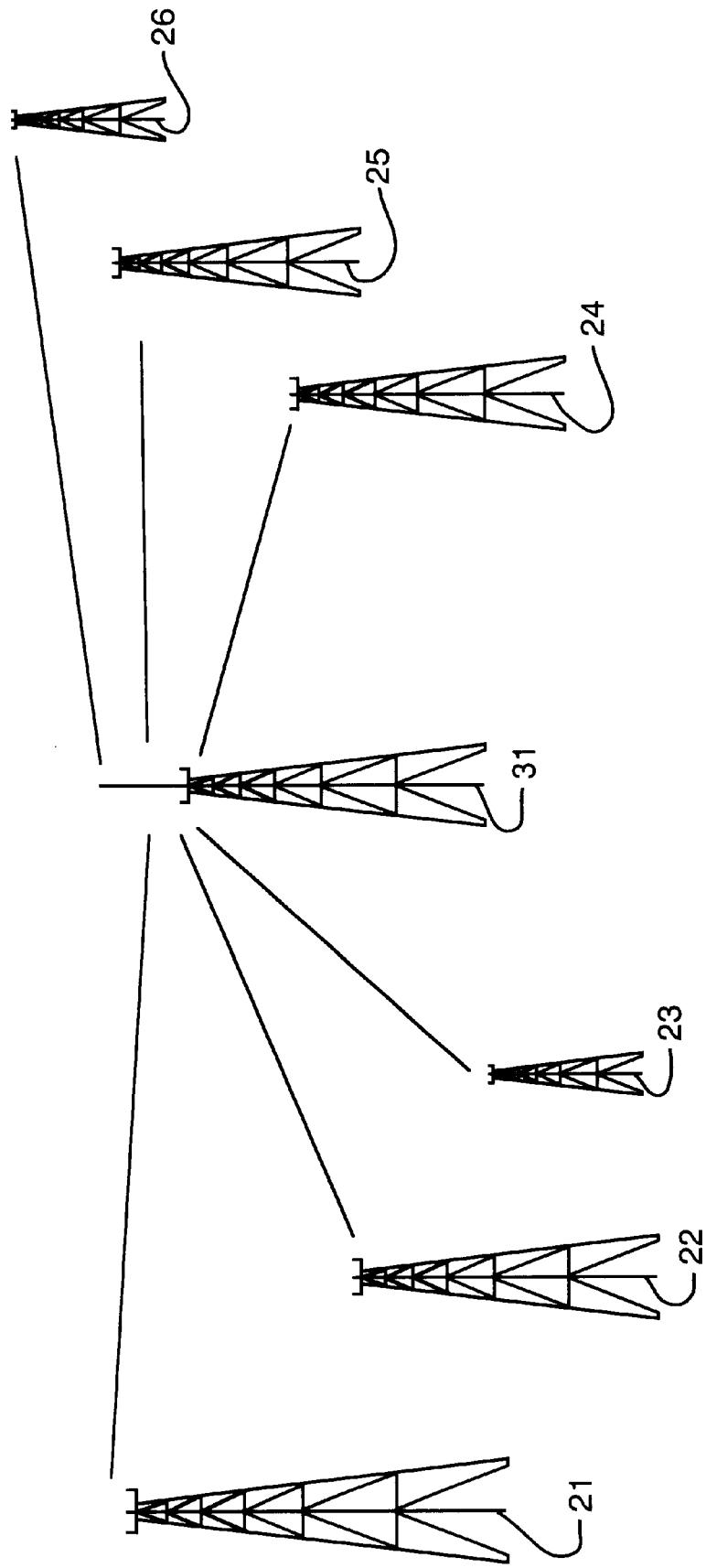
FIG. 2 is a diagram illustrating a digital network, consistent with the present invention, including a plurality of terminals communicating via terrestrial radio relay.

FIG. 2 is a diagram of a digital network of another embodiment in which the HUB 31 includes an antenna for a terrestrial network operating over radio frequency (RF). In this embodiment, terminals 21–26 are RF terminals and typically include, for example, an antenna, a power amplifier and a modem. Terminals 21–26 are located at arbitrary distances from the HUB 31, and have line-of-sight (LOS) view of the HUB 31, but do not necessarily have LOS view of each other. In other embodiments, the network may be a mobile packet radio network or any wireless or wireline network with shared channels.

In accordance with one aspect of the invention, the networks of FIGS. 1 and 2 use Direct Sequence Spread Spectrum (DSSS) encoding techniques in a particular manner so as to enable flexible allocation of channel capability or bandwidth. As is understood in the art, in DSSS, a pseudo-noise (P/N) code comprising a predefined number of chips, such as 512 chips, for example, can be used to spread an information symbol for transmission over the network. A receiver then detects the code using a correlator or matched filter to despread and recover the original information symbol.

Rather than using a plurality of different and non-orthogonal codes, a network consistent with the present invention uses a single or common code and implements multiple access by using cyclic rotations (sometimes referred to as cyclic shifts) of the code, which are orthogonal with one another. This code will hereinafter be referred to as a "cyclically orthogonal code". Each cyclic shift of the code by one chip is considered a separate phase. For a code with 512 chips, for example, there may be up to 512 phases or possible distinguishable rotations of the code, available for use in the system. In one embodiment, the receivers use a rotating correlator to search through or examine relevant phases of the cyclically orthogonal code sequence during each symbol interval. An advantage of this scheme is that a single rotating correlator can detect the data in several channels, transmitted from different terminals. Thus, multiple modems, one for each channel, may be avoided. In another embodiment, a technique using Fast Fourier Transforms (FFTs) is used to despread and recover the received information symbols by examining all relevant phases of the cyclically orthogonal code. This technique will be described in greater detail later.

Depending on the terminals' capabilities and needs, each terminal is allocated one or more consecutive cyclic shifts of this code. For example, one terminal may require 8 consecutive shifts of the code, while other terminals may require less or more than this amount. Thus, through this mechanism, the terminals can achieve different throughputs depending on their needs and capabilities by assigning to them a different number of consecutive shifts of the code.

In addition, by assigning to a terminal a subset of the total number of shifts, a coding gain of $10 \log_{10} [N/A]$ dB can be achieved where N is the number of chips in the cyclically orthogonal code sequence and A is the number of code shifts assigned to the terminal. This coding gain improves the Symbol Energy to Noise Density Ratio ($E_s/N_o$). Thus, if a terminal uses a smaller number of shifts of the code, the $E_s/N_o$ can be improved. As such, a terminal can achieve an improved Bit Error Rate (BER) while maintaining the same throughput data rate, or achieve a higher throughput data rate (assigning a greater number of bits to each symbol) while maintaining the BER.

Preferably, the terminals 21–26 coordinate their transmissions such that their RF signals (which are superimposed because they occupy the same portion of the frequency spectrum at the same time) arrive with near time alignment at the HUB 31.

Communications Format

Figure 3:
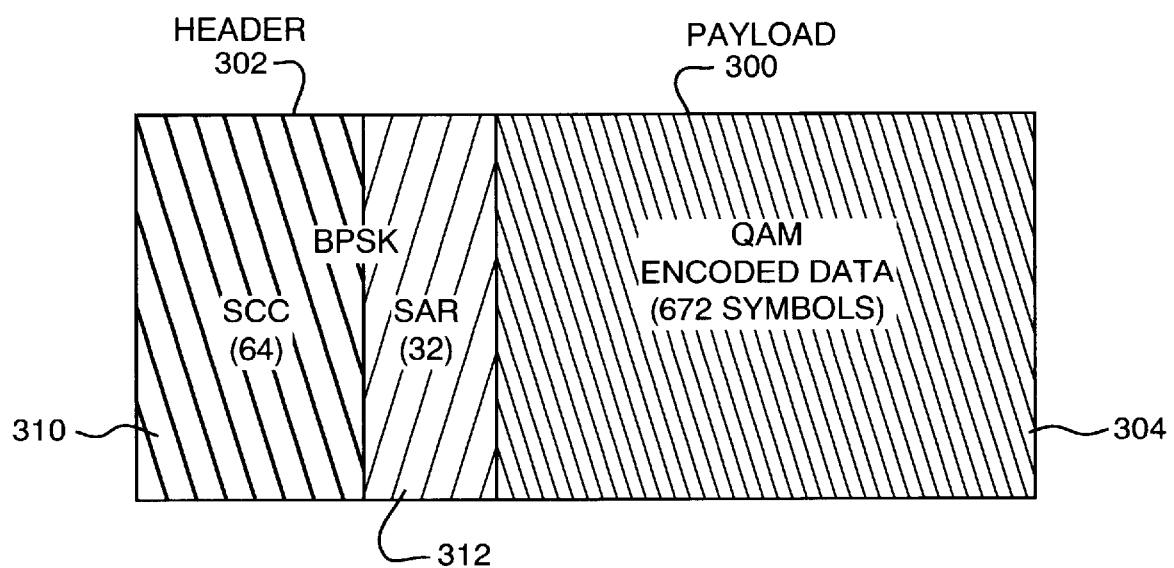
FIG. 3 is a diagram illustrating a container for carrying information, consistent with the present invention.

In an embodiment, containers are used for transmitting information. FIG. 3 illustrates a block diagram of a container 300. The container 300 includes a header 302 and a payload 304. The header 302 preferably consists of 96 symbols and the payload 304 preferably consists of 672 symbols. The header 302 is preferably further divided into two areas: a synchronization and channel characterization (SCC) area 310 of 64 symbols and a segmentation and re-assembly (SAR) area 312 of 32 symbols. The information in the SAR area 312 is used to reassemble the packets at the receiving end. SAR information preferably includes a packet identification, a container sequence number, the number of Quadrature Amplitude Modulation (QAM) cells in the packet, and the modulation level (m). The use of QAM cells and their modulation level will be discussed in greater detail later.

The SCC information preferably contains, among other things, a "unique word" consisting of a sequence of symbols intended to help the receiver identify the time instant and code-phase associated with the beginning of the container, a sequence of symbols intended to facilitate measurement of received signal and noise power levels, and a sequence of symbols intended to facilitate measurement of the channel impulse response.

Figure 4:
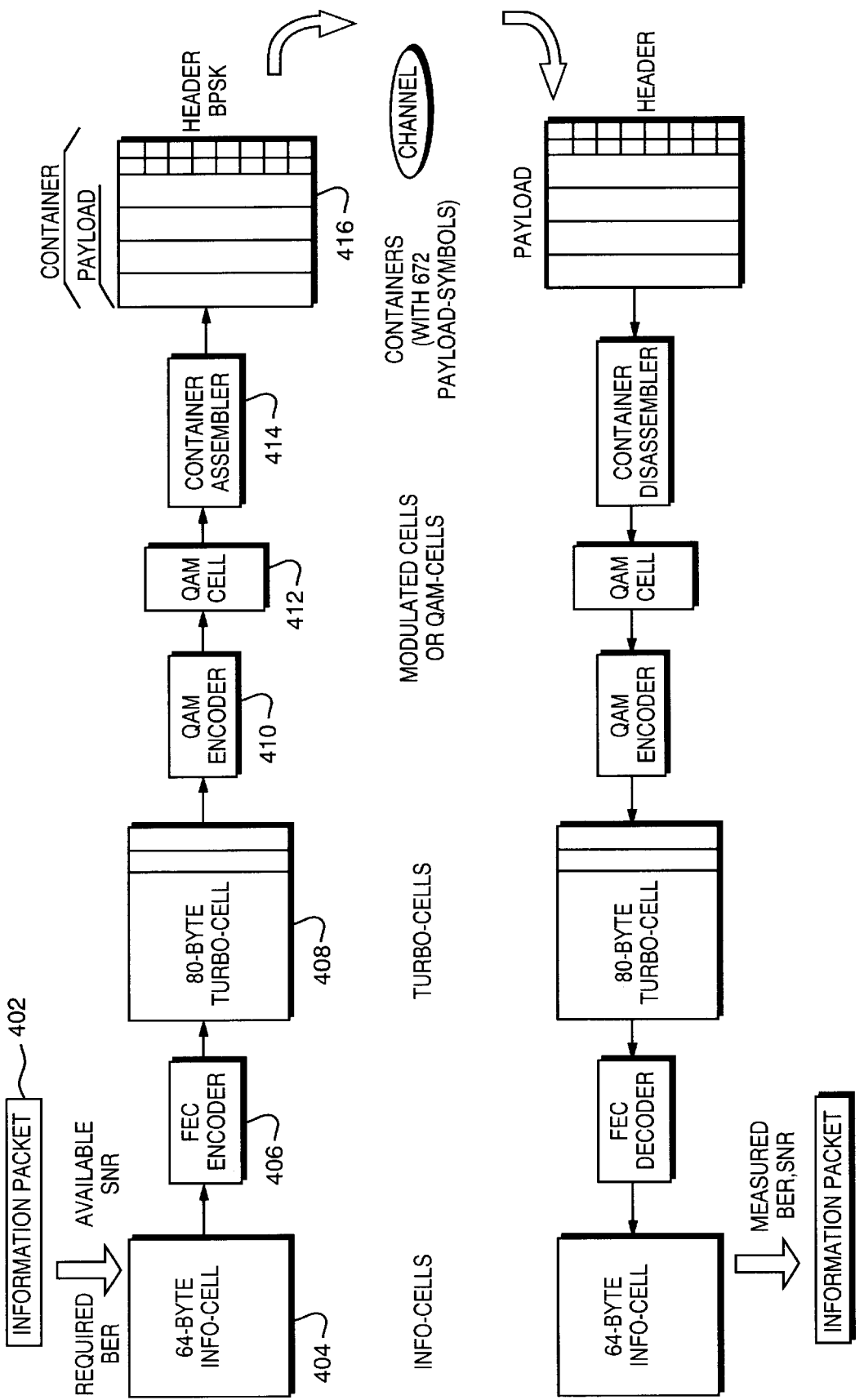
FIG. 4 is a diagram illustrating a method for generating containers from information packets, consistent with the present invention.
Figure 5:
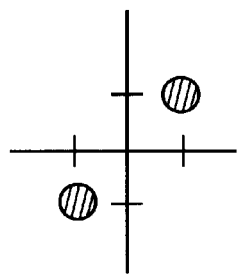
FIG. 5 is a graphical representation of 45 degree offset Binary Phase Shift Key (BPSK), or $2^m$-ary Quadrature Amplitude Modulation (QAM) for m=1, consistent with the present invention.
Figure 6:
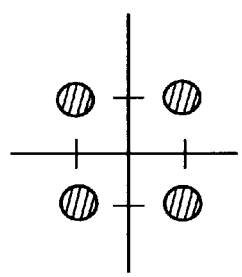
FIG. 6 is a graphical representation of $2^m$-ary QAM for m=2, consistent with the present invention.

FIG. 4 provides an illustration of how information packets at a terminal are packaged into containers for transmission and how they are retrieved from the containers by a receiver. As shown in the figure, a terminal, of a preferred embodiment, includes a Forward Error Correction (FEC) encoder 406, a quadrature amplitude modulation (QAM) encoder 410 and a container assembler 414. When a terminal has a packet of information 402 to transmit, it first breaks the packet into 64 byte info-cells 404. The FEC encoder 406 then encodes the info-cells, into 80 byte turbo-cells 408. In a preferred embodiment, FEC encoder 406 is a turbo encoder. In another embodiment, encoder 406 is a Reed-Solomon encoder.

Figure 7:
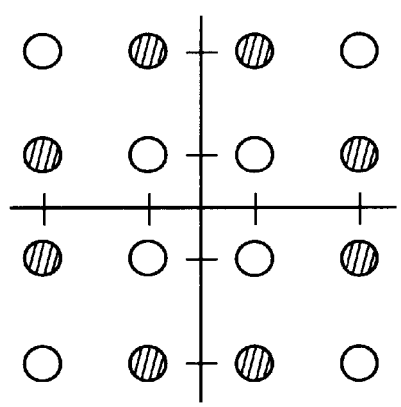
FIG. 7 is a graphical representation of $2^m$-ary QAM for m=3, consistent with the present invention.
Figure 8:
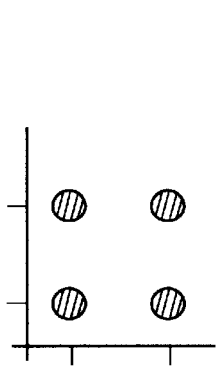
FIG. 8 is a graphical representation of the upper right hand quadrant of $2^m$-ary QAM for m=4, consistent with the present invention.
Figure 9:
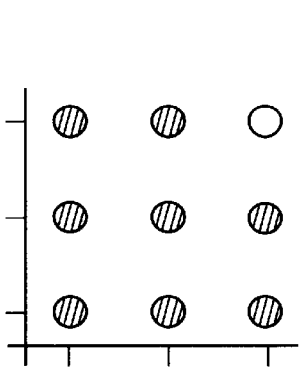
FIG. 9 is a graphical representation of the upper right hand quadrant of $2^m$-ary QAM for m=5, consistent with the present invention.
Figure 10:
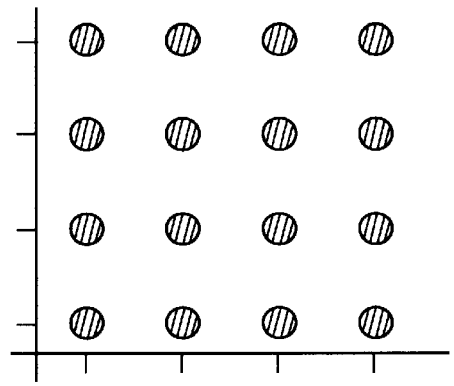
FIG. 10 is a graphical representation of the upper right hand quadrant of $2^m$-ary QAM for m=6, consistent with the present invention.
Figure 11:
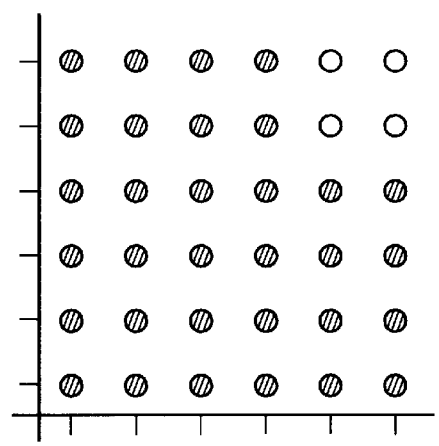
FIG. 11 is a graphical representation of the upper right hand quadrant of $2^m$-ary QAM for m=7, consistent with the present invention.
Figure 12:
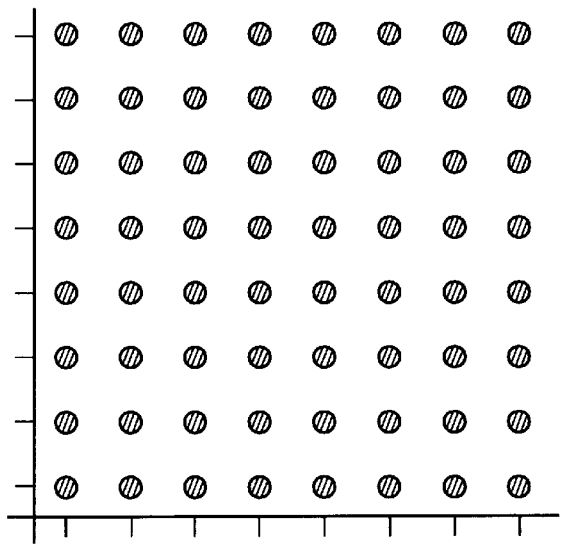
FIG. 12 is a graphical representation of the upper right hand quadrant of $2^m$-ary QAM for m=8, consistent with the present invention.

The QAM encoder 410 then modulates the turbo-cells 408 by compressing each turbo-cell into a QAM cell 412 of $2^m$-ary QAM symbols, each symbol carrying m bits of FEC encoded information. The QAM encoder 410 preferably uses the same modulation level, that is the same value of m, for all turbo-cells associated with a given information packet. In order to ensure that a QAM cell has an integer number of symbols, it is necessary, for certain values of m, to pad the bit sequence in the turbo-cell. FIGS. 5–12 illustrate $2^m$-ary QAM constellations for m=1–8. In FIGS. 8–12, only the upper right hand quadrant of the constellation is shown, as the other three quadrants are merely mirror images of this quadrant. As illustrated in FIGS. 7, 9, and 11, these $2^m$-ary QAM constellations are preferably obtained from punctured $N^2$-ary QAM constellations.

The container assembler 414 (FIG. 4) then packages the QAM cells into the payload of a container 416. Payloads are preferably 672 symbols long, and exactly "m" QAM-cells are concatenated, scrambled, and loaded into the payload. A header is then assembled for the payload, preferably containing, along with other information, information on the modulation level used for encoding the payload. Unlike the payload, the header is preferably modulated using 45 degree offset Binary Phase Shift Key (BPSK).

The terminal then transmits the container over a channel to a receiver where the information is extracted using the same steps, but in reverse order, as shown in FIG. 4. Prior to transmission over the channel, a precoder (not shown) may be used to minimize the channel's effects on the transmitted signal.

At the receiver, after the containers are separated from each other, or alternatively, after the containers received from each transmitter are grouped together, an equalizer (not shown) may be used to further reduce the channel's effects on the transmitted signal.

The receiver preferably processes containers independently from each other. The containers preferably only carry an integer number of cells. Containers originating from a single information packet are preferably transmitted in sequence to simplify reassembly at the receiver.

Figure 13:
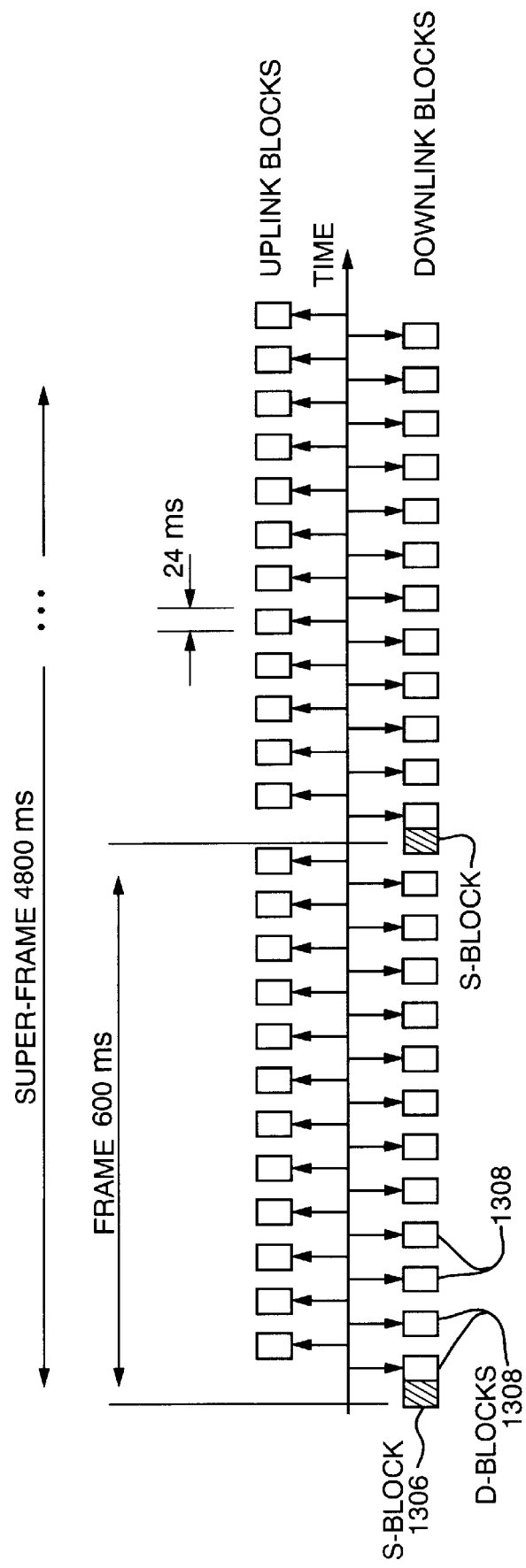
FIG. 13 is an illustration, consistent with the present invention, of using Synchronization-blocks and Data-blocks in a time-division duplex transmission scheme.

FIG. 13 illustrates a transmission scheme of an embodiment in which transmission between the terminals 21–26 and HUB 31 is time-division-duplex alternating between terminals 21–26 transmitting to the HUB 31 and the HUB 31 transmitting to the terminals 21–26. In another embodiment, transmission is frequency-division-duplex.

As shown in FIG. 13, information is preferably transmitted over the channel in frames 1302, and 8 frames 1302 comprise a superframe 1304. Each frame 1302 consists of one synchronization block (S-block) 1306 and 24 data blocks (D-blocks) 1308. In this embodiment, the S-block and 12 of the 24 D-blocks are used for transmission from the HUB, while the remaining 12 D-blocks are used for transmission from the terminals. As will be described in greater detail later, S-blocks are used for transmitting synchronization and frame number information, while D-blocks are used for transmitting containers. Preferably, each block is 24 milliseconds, each frame is 600 milliseconds, and each superframe is 4800 milliseconds in length. As will be obvious to one of skill in the art, the time lengths of these structures is not material to the invention, and different time lengths may be used without altering the scope of the invention. In addition, although FIG. 13 shows a time-division duplex implementation, as will be obvious to one of skill in the art, other embodiments may be used such as a frequency-division duplex implementation.

As previously indicated, a container 300 (FIG. 3) preferably includes both a header 302 and a payload 304, where the header 302 comprises 96 header symbols modulated with 45 degree offset BPSK and the payload comprises 672 info-symbols modulated with $2^m$-ary QAM. Collectively, the header-symbols and info-symbols may be referred to as data-symbols. The modulation level is preferably the same for all info-symbols of all payloads of an information packet, but may be different for payloads of different information packets.

Figure 14:
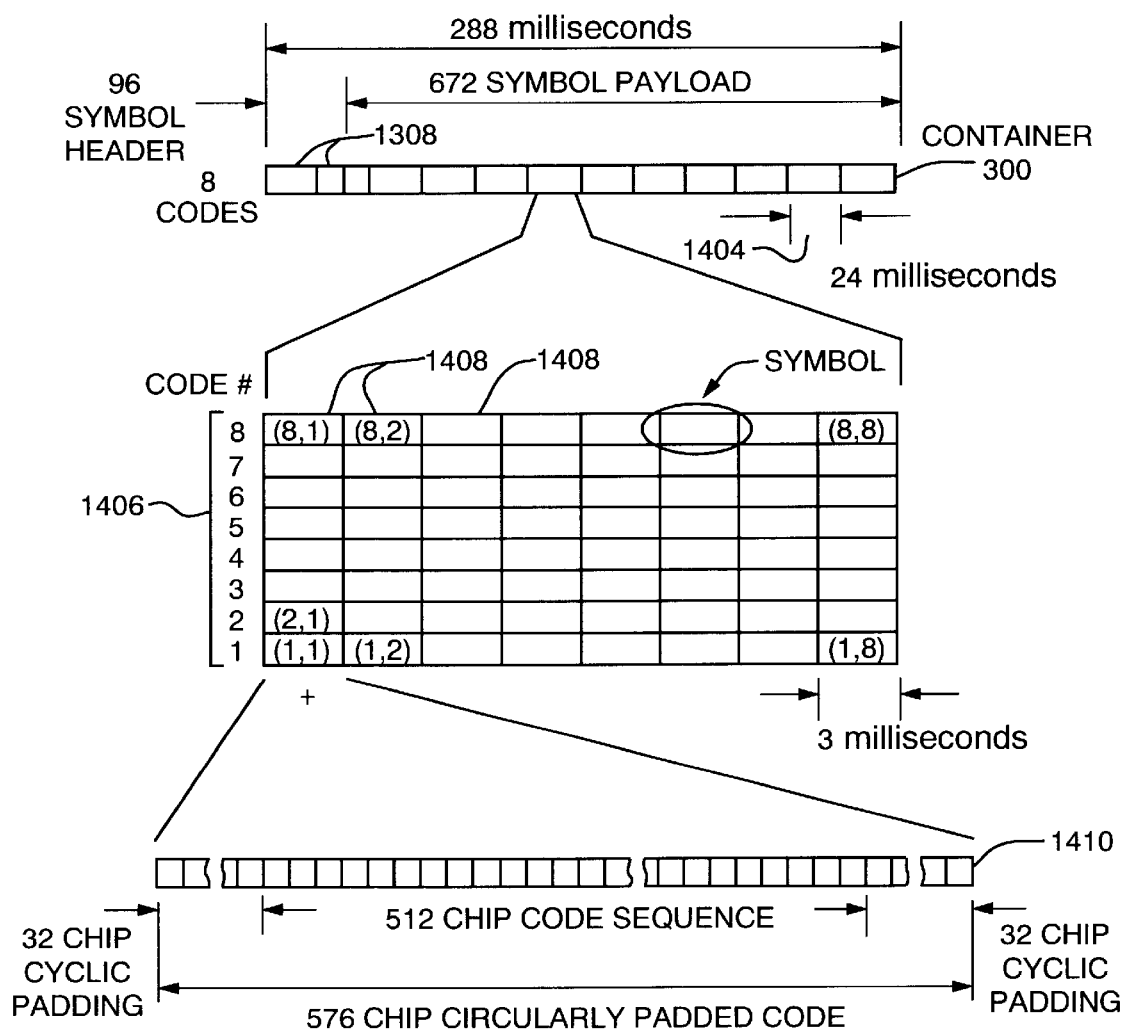
FIG. 14 is an illustration of container structure for use in a terminal assigned 8 shifts of the code, consistent with the present invention.

FIG. 14 illustrates a preferred container structure for a terminal that is assigned 8 consecutive shifts of a cyclically-orthogonal code having 512 chips. In this illustration, the terminal transmits a container 300 using the 12 D-blocks of a frame allocated for transmission. In this illustration, containers 300 are transmitted using the above described D-blocks 1308. As such, each 24 millisecond time interval 1404, is preferably a D-block 1308. As shown in FIG. 14, 8 symbols 1408 per assigned shift are preferably transmitted per 24 millisecond time interval 1404. Thus, as there are 8 assigned consecutive shifts 1406, the terminal of this illustration transmits 8*8=64 (# of assigned code shifts * # symbols per assigned shift per 24 millisecond interval) symbols per 24 millisecond D-block. Accordingly, the terminal of this embodiment transmits 768 data-symbols, including 672 info-symbols plus 96 header-symbols per container. Thus, in this illustration, 768÷64=12 D-blocks are used to transmit each container.

As will be discussed later, each circular shift of the cyclically-orthogonal code is preferably circularly padded by 32 chips at the beginning and 32 chips at the end to create a code referred to as a circularly padded code 1410. These codes 1410 are then used to spread each symbol 1408, as shown in FIG. 14. As such, in this example, each symbol is spread by a 576 chip code, and a symbol is transmitted over 3 milliseconds. Accordingly, in this example, the chip rate is 192 Kchips/second.

QAM Modulation

As previously indicated, the payload is preferably modulated using $2^m$-ary QAM constellations that are obtained from $N^2$-ary QAM constellations. When m is odd, these $2^m$-ary QAM constellations are obtained by puncturing an $N^2$-ary QAM constellation. The same level of modulation (m) is preferably used for modulating all symbols in the payload. It is possible, however, to modulate the payloads of different containers with different levels of modulation. The header, however, is preferably modulated using 45 degree offset BPSK.

The loading of data symbols and QAM cells into containers is illustrated in the table below. Padding (e.g., for m=3,6, and 7) is used as necessary within the QAM cell and within the payload.

TABLE 1

Load of QAM cells into containers

| m | # info symbols per QAM cell | # QAM-cells per container | # header symbols per container | # info-symbols per container | # data symbols per container |
|---|---|---|---|---|---|
| 1 | 640 | 1 | 64 + 32 | 640 + (32 zeroes) | 768 |
| 2 | 320 | 2 | 64 + 32 | 640 + (32 zeroes) | 768 |
| 3 | 224 (214 + 10 zeroes) | 3 | 64 + 32 | 672 | 768 |
| 4 | 160 | 4 | 64 + 32 | 640 + (32 zeroes) | 768 |
| 5 | 128 | 5 | 64 + 32 | 640 + (32 zeroes) | 768 |
| 6 | 112 (107 + 5 zeroes) | 6 | 64 + 32 | 672 | 768 |
| 7 | 96 (92 + 4 zeroes) | 7 | 64 + 32 | 672 | 768 |
| 8 | 80 | 8 | 64 + 32 | 640 + (32 zeroes) | 768 |

The payload of each container carries "m" QAM cells, with the exception of the payload of the last container that may carry fewer than m QAM cells. The actual number of QAM cells contained in the last container depends on the length of the packet and on the selected modulation level. The modulation level is preferably kept constant for all payloads originating from a single information packet. The modulation level may vary from packet to packet and is preferably selected as a function of a target bit error rate (BER), or Quality of Service (QOS), for the packet and an available (SNR). As such, it is possible to independently select the modulation level m to be used with a particular packet or channel. In addition to selecting the modulation level m based on the BER or QOS for the information and the available SNR, a power level for transmitting the packet may also be determined based on this information.

Synchronization

The network preferably synchronizes terminals 21–26 to the HUB 31 by frequency locking a local reference clock at each terminal to a master reference clock at the HUB 31. Frequency locking is performed during terminal initialization, maintained during steady-state operation, and achieved through an over-the-air phase-locked-loop (PLL). Phase error tracking information used by this PLL may be derived from differences between a locally generated clock and a received signal.

As previously indicated, the network preferably uses two types of blocks: synchronization blocks (S-blocks) and data blocks (D-blocks), as shown in FIG. 13. S-blocks are transmitted by the HUB 31 and are used by the terminals 21–26 for synchronization. S-blocks are preferably sent in a manner such that all terminals, regardless of distance to the HUB 31, may reliably extract the following information: the HUB's clock frequency, carrier phase offset, the start of a frame, and the frame number (within a super frame).

Guard Codes

Figure 15:
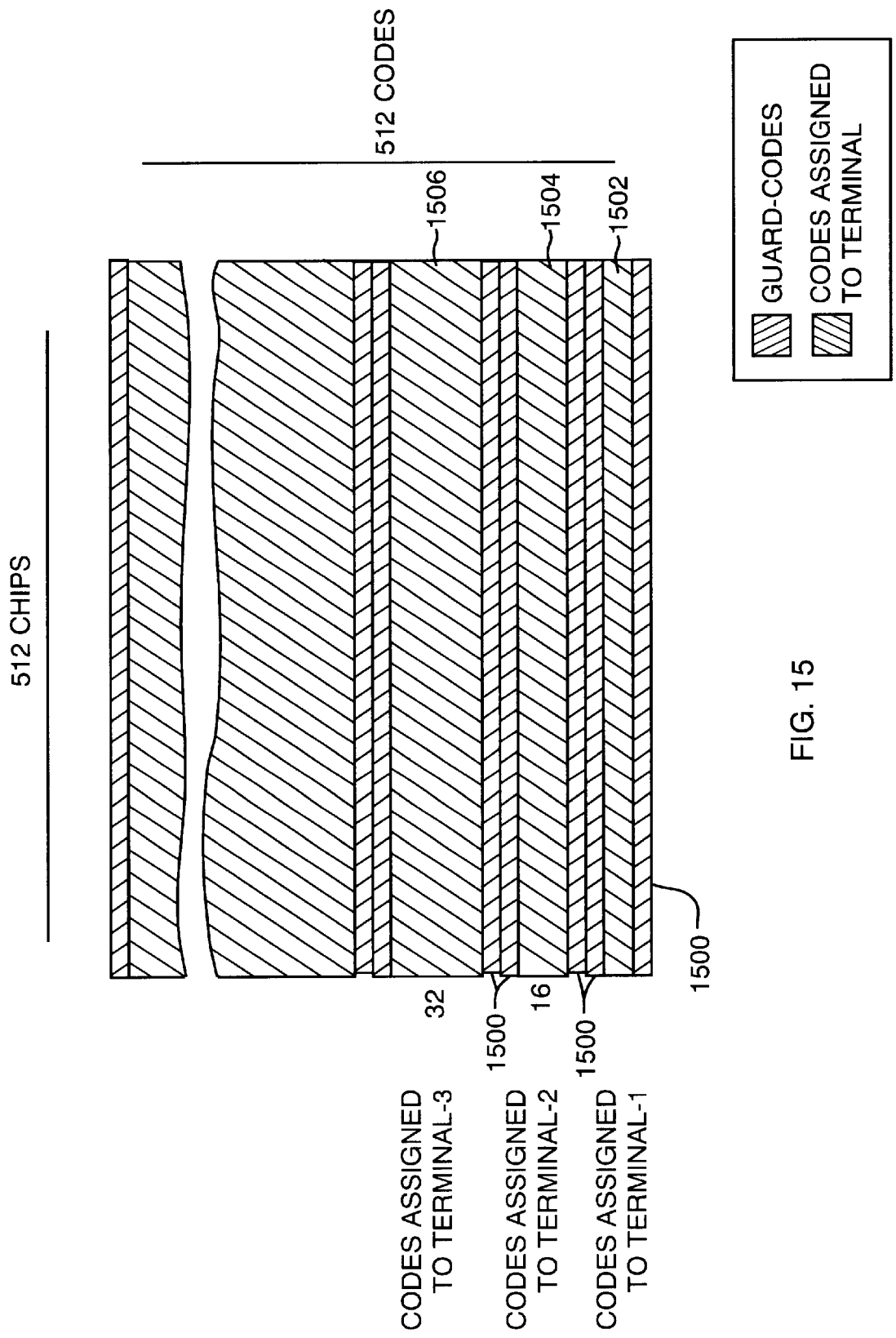
FIG. 15 illustrates code assignments to terminals and their respective guard bands, consistent with the present invention.

In a preferred embodiment, a fixed number of consecutive shifts of the code are assigned to a particular terminal. Although synchronization is used so that transmissions from different terminals arrive at the HUB at approximately the same time, complete synchronization may not be possible. Thus, a guard band is established between each set of consecutive shifts of codes assigned to a terminal, such as is illustrated in FIG. 15. A guard band is a group of unassigned consecutive shifts of the code 1500.

As illustrated in FIG. 15, 8 consecutive shifts of the code 1502 may be assigned to terminal-1 with 8 guard codes 1500 on each side. In addition, 16 consecutive codes 1504 may be assigned to terminal-2, also with 8 guard codes 1500 on each side. Also, 32 consecutive codes 1506 may be assigned terminal-3, with 8 guard codes 1500 on each side. Thus, if for example, there are 512 codes, each terminal in the system can be assigned a particular group of consecutive codes out of these 512 codes depending on its needs with two unassigned groups of 8 guard codes (16 guard codes altogether) between one assigned group of codes and the next assigned group of codes.

The number of guard codes is preferably determined according to the relative synchronization accuracy. For example, one guard code can be assigned to terminals synchronized within +/− one-half chip interval and transmitting simultaneously, two guard codes may be assigned to terminals synchronized within +/− one chip interval, and so on.

As will be understood by one of skill in the art, the above guard codes will not be enough by themselves to eliminate partial cross-correlations caused by misalignments among the received signals and/or between these signals and timing events derived from a local reference clock. These misalignments will generally manifest themselves as a combination of an integer number chip times plus a fraction of a chip time. In other direct sequence spread spectrum (DSSS)-based communication systems, such integer and fractional chip-time misalignments result in undesirable cross-correlations and mutual interference between signals from multiple transmitters. These undesirable cross-correlations and mutual interference can be particularly troublesome when the transmitted signals are received with different power levels. Such undesirable cross-correlations and mutual interference is normally referred as the near-far effect and, to help manage this effect, other DSSS-based communications systems commonly incorporate costly interference-reduction methods such as transmitter power control. However, as will be described later, in an embodiment of the invention the codes are circularly padded in a manner that maintains the orthogonality of the codes despite these misalignments. As such, the present invention practically eliminates the undesirable cross-correlations, the mutual interferences, and the near far effect along with the need for costly interference-reduction methods such as transmitter power control.

Transmission

The network preferably uses a technique that combines the advantages of DSSS techniques and time division multiple access (TDMA) techniques for transmitting containers over a channel.

In an embodiment, the network uses DSSS techniques with orthogonal codes that are robust to arbitrary time offsets. These codes are preferably derived from a family of codes obtained from a base code (of arbitrary length N) and circularly-shifted versions of it. Any consecutive number of these codes (up to a maximum of N) can be assigned to any terminal in the network.

In an embodiment, QAM symbols are spread with orthogonal codes. If the terminal is assigned more than one code, the resulting spread symbols corresponding to the same symbol time are then summed. This allows transforming any spread spectrum processing gain directly into Es/No gain and enabling, therefore, transmission of multiple bits per symbol with multiple level modulation (e.g., $2^m$-ary QAM).

In one embodiment, a ternary sequence is used to spread the signal. The ternary sequence is preferably determined by first selecting an M-sequence (maximal-length), which may be generated by a linear feedback shift register that generates $N=2^M-1$ binary elements before the sequence repeats. This M-sequence can be represented as $q_1, q_2, q_3, \ldots, q_N$. Then a circular shift of this original M-sequence is determined. This circular shift can be represented as, for example, $q_k q_{k+1}, q_{k+2}, \ldots, q_N, q_1, q_2, \ldots q_{k-1}$. Because these are binary M-sequences, $$\sum_{n=1}^{N} q_n q_{n\oplus k-1} = \begin{cases} N & k=1 \\ -1 & k \neq 1 \end{cases}, \text{ where } q_n = +/-1$$

Thus, let $Q_k(n) = q_{n\oplus k-1}$, where $Q_k(n)$ is the original code if $k=1$ and $Q_k(n)$ is a circular shift of the original code if $1 < k \leq N$.

Next, one shift of a code is subtracted from another shift of a code. The resulting code is therefore $$R_k(n) = Q_k(n) - Q_{k\oplus L}(n) = \begin{cases} +2 \\ 0 \\ -2 \end{cases}$$

where $L=(N-1)/2$. Thus, for each k (where $k=1, 2, \ldots, L$), $R_k(n)$ is a sequence of $N=2^M-1$ ternary elements, and for each $k=1, 2, \ldots L-1$ the sequence $R_{k+1}(n)$ is a circular shift of $R_k(n)$. Every one of these L sequences is orthogonal to every other one of these L sequences.

Figure 16:
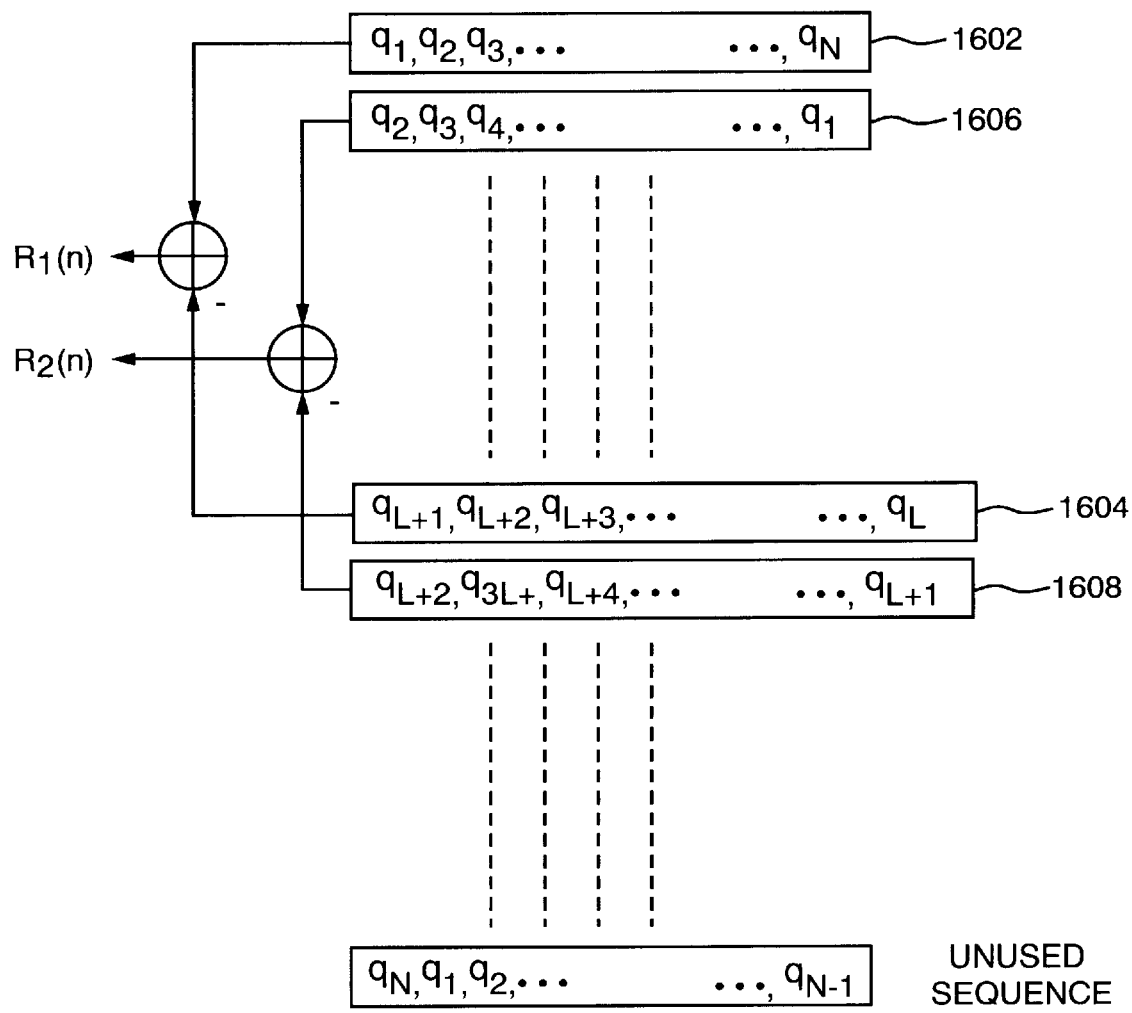
FIG. 16 illustrates a method, consistent with the invention, for subtracting M-sequences in order to generate a ternary sequence.

FIG. 16 provides an illustration of a process, consistent with the invention, for performing this subtraction. As shown, the $L^{th}$ shift of the original sequence, $q_{L+1}, q_{L+2}, \ldots q_L$, 1604 is subtracted from the original sequence, $q_1, q_2, q_3, \ldots, q_N$ 1602 to produce a sequence $R_1(n)$, where $R_1(n)$ is a ternary sequence with elements having a value of either +2, 0, or −2. The $(L+1)^{th}$ shift of the original sequence, $q_{L+2}, q_{L+3}, \ldots, q_{L+1}$, 1608 is then subtracted from first shift of the original sequence, $q_2, q_3, \ldots, q_1$, 1606 to produce a ternary sequence $R_2(n)$. This method is then continued to yield the $L=(N-1)/2$ ternary sequences.

In another embodiment, the network uses rows of a circulant-unitary (CU) matrix for communications. CU matrices are useful in that each row is not only a circular shift of every other row, but is also orthogonal to every other row. In order for a matrix, C, to be a CU matrix it must possess two properties:

1. C is a circulant. That is, C satisfies the following:

$$C = \begin{bmatrix} c_1 & c_2 & c_3 & \ldots & c_N \\ c_N & c_1 & c_2 & \ldots & c_{N-1} \\ c_{N-1} & c_N & c_1 & \ldots & c_{N-2} \\ \vdots & \vdots & \vdots & \ldots & \vdots \\ c_2 & c_3 & c_4 & \ldots & c_1 \end{bmatrix}$$

2. C is unitary. For C to be unitary it is necessary that:

$$CC^H = I = \begin{bmatrix} 1 & 0 & 0 & \ldots & 0 \\ 0 & 1 & 0 & \vdots & \vdots \\ 0 & 0 & \ddots & 0 & 0 \\ \vdots & \vdots & 0 & 1 & 0 \\ 0 & \ldots & 0 & 0 & 1 \end{bmatrix}$$

where $C^H$ is the conjugate transpose of C, and I is the identity matrix. Thus, if C satisfies both requirements, it is a CU matrix.

In order to generate a CU matrix, it is first necessary to recognize that $$\tilde{C} = ZCZ^H = \begin{bmatrix} \tilde{c}_1 & 0 & 0 & \ldots & 0 \\ 0 & \tilde{c}_2 & 0 & \ldots & 0 \\ 0 & 0 & \tilde{c}_3 & \ldots & 0 \\ \vdots & \vdots & \vdots & \ddots & 0 \\ 0 & 0 & 0 & \ldots & \tilde{c}_N \end{bmatrix}$$

where Z is a Discrete Fourier Transform (DFT) matrix and $Z^H$ is its conjugate transpose. Thus, because $Z^H Z = I$ and $ZZ^H = I$ any circulant matrix C can be expressed as $$C = Z^H \tilde{C} Z$$

and $$CC^H = Z^H \tilde{C} Z Z^H \tilde{C}^H Z = Z^H \tilde{C} \tilde{C}^H Z$$

where, $C^H = (Z^H \tilde{C} Z)^H = Z^H \tilde{C}^H Z$. Thus, if and only if $$\tilde{C} \tilde{C}^H = I$$

will the circulant matrix C be unitary.

Thus, the following must be satisfied for C to be a CU matrix:

$$\tilde{C}\tilde{C}^H = I = \begin{bmatrix} \tilde{c}_1 & 0 & \ldots & 0 \\ 0 & \tilde{c}_2 & \ldots & \vdots \\ \vdots & \vdots & \ddots & 0 \\ 0 & \ldots & 0 & \tilde{c}_N \end{bmatrix} \begin{bmatrix} \tilde{c}_1^* & 0 & \ldots & 0 \\ 0 & \tilde{c}_2^* & \ldots & \vdots \\ \vdots & \vdots & \ddots & 0 \\ 0 & \ldots & 0 & \tilde{c}_N^* \end{bmatrix} = \begin{bmatrix} 1 & 0 & \ldots & 0 \\ 0 & 1 & \ldots & \vdots \\ \vdots & \vdots & \ddots & 0 \\ 0 & \ldots & 0 & 1 \end{bmatrix}$$

Therefore, the above will be true if and only if $$\tilde{c}_n \tilde{c}_n^* = |\tilde{c}_n|^2 = 1$$

for $n=1, 2, \ldots, N$ and this will be true if and only if $\tilde{c}_n = \exp(i\theta_n)$.

Figure 17:
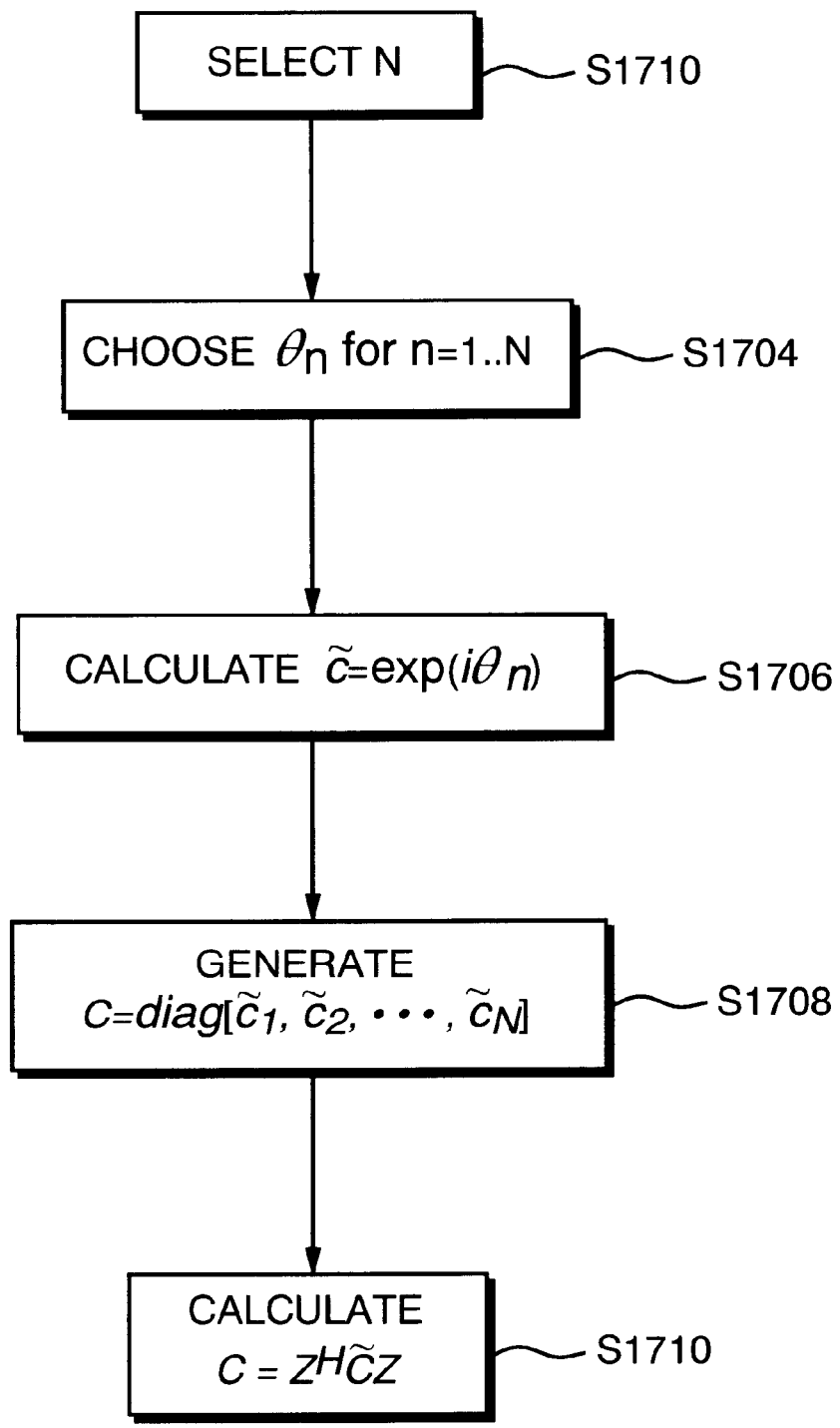
FIG. 17 illustrates steps for generating a circulant-unitary matrix, consistent with the present invention.

As such, in a preferred embodiment a CU matrix may be determined by the following steps. FIG. 17 provides a flow chart for performing these steps.

1. Determining the number of rows desired in the matrix, N. (S1702).

2. Choosing a $\theta_n$ for n=1 ... N. (S1704).

3. Calculating $\tilde{c}_n=\exp(i\theta_n)$ for n=1 ... N. (S1706)

4. Forming $\tilde{C}=\text{diag}[\tilde{c}_1,\tilde{c}_2,\tilde{c}_3, \ldots \tilde{c}_N]$ (S1708)

5. Calculating $C=Z^H\tilde{C}Z$, where C is the desired matrix. (S1710)

This method yields N sequences each consisting of N elements, such that each of these N sequences is orthogonal to every other one of these N sequences. In a preferred embodiment, N is equal to 512 chips.

In another embodiment, scaled versions of the rows of a circulant-unitary matrix are used for transmitting the signals.

As will be familiar to one of skill in the art, the elements of the above described sequences are commonly referred to as chips, and there are other sequence design techniques that can be used for generating the orthogonal codes.

Shift-Orthogonality and Circular Padding of Sequences

Figure 18:
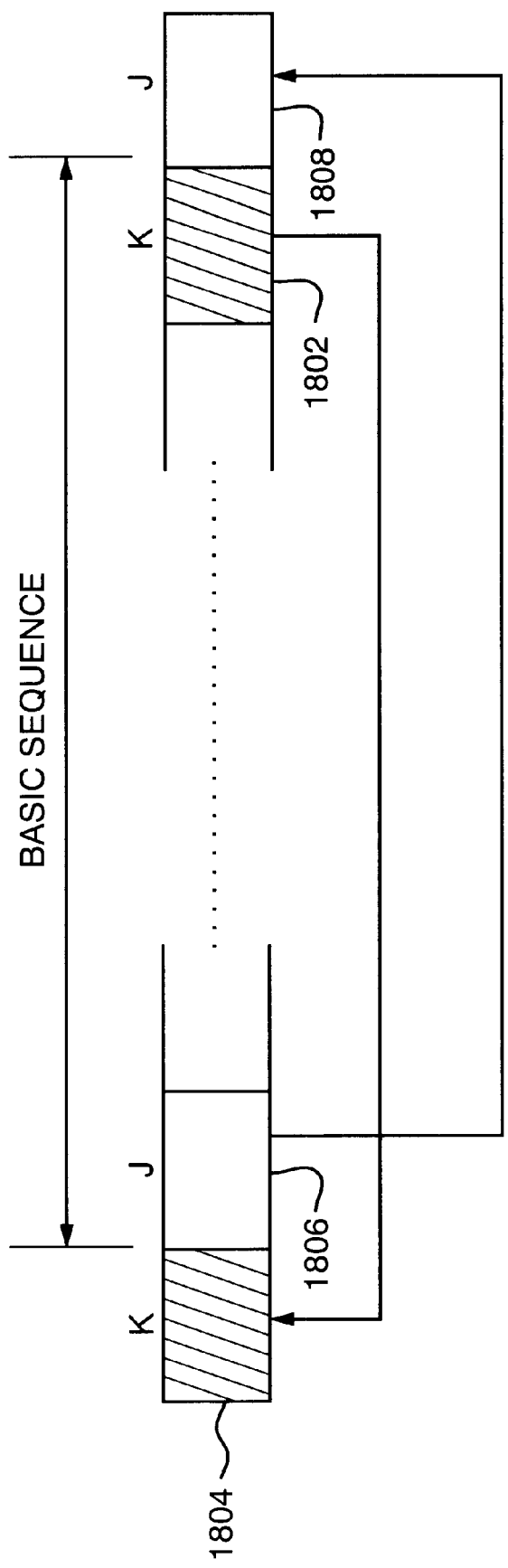
FIG. 18 illustrates a circularly padded code, consistent with the present invention.

FIG. 18 provides an illustration of a process for circularly padding the code sequences. After determining the cyclically-orthogonal codes that will be used for spreading the signals, it is preferable to circularly pad the code to improve the code's tolerance for arbitrary time shifts. As shown in FIG. 18, in a preferred embodiment, K chips from the end of the code 1802 are copied and placed at the front of the code 1804 and J chips from the front of the code 1806 are copied and placed at the end 1808. As will be obvious to one of skill in the art, the number of chips padded to the front and end of the code may vary and may be adjusted to fit the needs of the particular implementation. In a preferred embodiment, J and K are both 32 chips.

By using the aforementioned cyclically orthogonal codes together with the above circular padding, code sequences may be obtained that possess a shift-orthogonality property, as will be presently described, thus achieving a desired system tolerance to time shifts. To understand the shift-orthogonality property, suppose that $a_m$ for m=1, 2, ..., N, is one of the family of $L \leq N$ cyclically-orthogonal code sequences, and that, prior to its use for symbol spreading and transmission, it has been extended by circular-padding as described above so that $a_m$ is also defined for m=1−K, ..., −1, 0 and for m=N+1, N+2, ..., N+J. Also observe that, for any fixed v=−K, ... J, the subsequence, $a_{m+v}$, for m=1, 2, ..., N, is one of the family of $L \leq N$ cyclically-orthogonal code sequences. Now suppose that another code sequence, $b_m$ for m=1, 2, ..., N, in this family is not one of the aforementioned subsequences, $a_{m+v}$. Because these sequences are orthogonal, they satisfy the following relationship:

$$\sum_{m=1}^{N} b_m a_{m+v}^* = 0 \text{ for } v = -K, \ldots, J.$$

This equation describes a correlation, or matched-filter, operation, and shows that the sequence orthogonality is maintained even over a range of integral time-shifts, $vT_c$, where $T_c$ is the chip time.

In an embodiment, circular padding of cyclically orthogonal sequences is used along with guard codes. Through this technique a number, G, of sequence set pairs may be generated, wherein each sequence set pair consists of a "transmit sequence set" and a "match sequence set." A "transmit sequence set" consists of P(g) code sequences each consisting of K+N+J chips, where g=1, ... G. Each match sequence set corresponding to a transmit sequence set consists of K+P(g)+J code sequences each consisting of N chips. The individual elements, or chips, of the various transmit sequence sets can be represented by $a_{\{m+v\}}(g,p)$ where g=1,2, ... G; p=1, ... ,P(g); m=1,2. ..N; and v=−K, ...J. The individual elements, or chips, of the various match sequence sets can be represented by $b_m(g,q)$, where g=1, ... .G; q=1−K, ... ,P(g)+J; and m=1,2. .. N. Furthermore, these G sequence set pairs are preferably designed such that $$\sum_{m=1}^{N} b_m(g, q) a_{m+v}^*(h, p) = 0 \text{ if } g \neq h$$

for p=1,2, ... ,P(h) and q=1−K, ... ,P(g)+J and v=−K, ... ,J while $$\sum_{m=1}^{N} b_m(g, q) a_{m+v}^*(g, p) = \begin{cases} N & \text{if } q = p + v \\ 0 & \text{if } q \neq p + v \end{cases}$$

for p=1,2, ... ,P(g), q=1−K, ... ,P(g)+J, and v=−K, ... ,J. The first of these last two equations expresses the fact that, if g≠h, each sequence from match sequence set g is orthogonal to every subsequence, v, of every sequence, p, of transmit sequence set h. The second of these last two equations expresses the fact that, the $q^{th}$ sequence of match sequence set g is orthogonal to the $v^{th}$ subsequence of the $p^{th}$ sequence of transmit sequence set g if q≠p+v but is not orthogonal if q=p+v. Together, the properties expressed by these last two equations is called the "shift-orthogonality property."

The transmit sequence sets may be composed of longer, or extended, sequences without detracting from the shift orthogonality property. In an embodiment, K=J=8 guard codes are used with cyclically-orthogonal sequences composed of N=512 chips but the transmit sequence sets are generated by circular padding 32 chips at the front and 32 chips at the end of various phases of the cyclically-orthogonal sequence so that each sequence, in each transmit sequence set, is composed of 576 chips. Nonetheless, the resulting sequence set pairs satisfy the aforementioned shift-orthogonality property for K=J=8.

An embodiment of this invention generates, for g=1, 2, ..., G, transmit sequence sets and corresponding match sequence sets with the aforementioned shift-orthogonality property and assigns, to each of several terminals, one or more of the transmit sequence sets such that no two terminals are assigned the same transmit sequence set. Each such terminal of the embodiment uses its assigned transmit sequence set to spread data symbols and, if the assigned transmit sequence set includes more than one sequence, the spread symbols corresponding to the same symbol time are then summed to create a digital baseband signal. A receiver of the embodiment then uses the match sequence sets corresponding to all assigned transmit sequence sets to recover, or despread, the data symbols by computing all relevant correlations. Because the transmit sequence sets and corresponding match sequence sets satisfy the aforementioned shift-orthogonality property, such correlations will not include any undesirable cross-correlations or mutual interference due to an integral time-shift, or misalignment, $vT_c$.

In another embodiment, more than one terminal may be assigned and share the use of one transmit sequence set by using some multiple access scheme, such as TDMA or ALOHA.

As will be obvious to one of skill in the art, such sequence orthogonality over integral time-shifts is, by itself, inadequate to assure that the corresponding analog waveforms will be orthogonal over time-shifts, τ, which may include both integral and fractional multiples of the chip time, $T_c$. That waveform orthogonality over time-shifts, τ can practically be achieved is described below.

Figure 19:
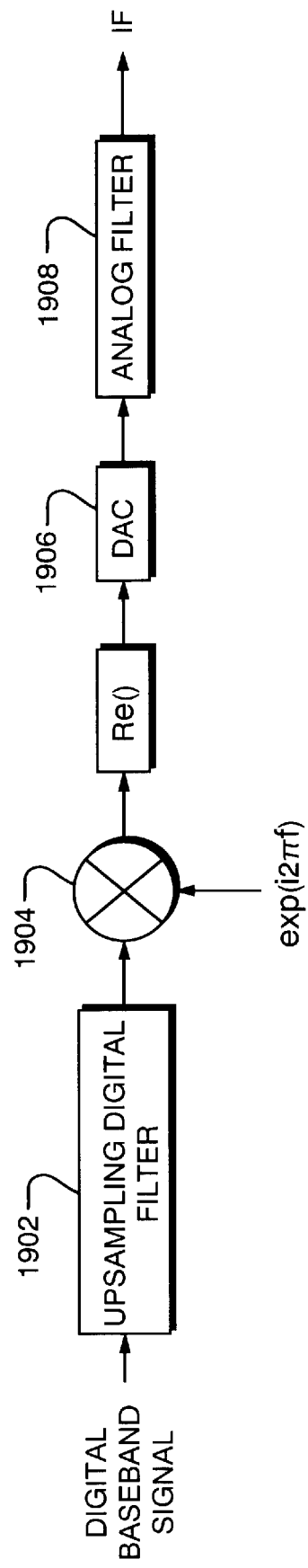
FIG. 19 illustrates steps for converting a signal from baseband to intermediate frequency, consistent with the present invention.

FIG. 19 provides an illustration of a process for converting the digital baseband signal to intermediate frequency (IF) prior to transmission over the air. To accomplish this, a terminal uses an upsampling digital filter 1902, a multiplier 1904, a digital-to-analog converter (DAC) 1906, and an analog filter 1908. The upsampling digital filter 1902 first upsamples the arriving symbols, and is preferably a finite impulse response (FIR) lowpass filter whose design characteristics are chosen in part to minimize intersymbol interference. Multiplier 1804 then multiplies the output of the upsampling digital filter 1902 by a complex exponential time sequence exp(i2Πfn).

DAC 1906 then converts the real part of the output of multiplier 1902 to an analog signal and analog filter 1908 then filters it. Although, the analog filter 1902 may be an infinite impulse response (IIR) filter, preferably it may be modeled as a FIR filter. The resulting IF signal is then upconverted to RF, transmitted over the channel and then converted back to baseband using these same steps, but in reverse order, as the above described conversion from baseband to RF. That is, the received signal is downconverted from RF to IF, filtered by an analog filter, converted to digital by an analog-to-digital converter (ADC), multiplied using a multiplier, and then downsampled by a downsampling digital filter. Like the upsampling digital filter, the downsampling digital filter is preferably a FIR lowpass filter.

The FIR upsampling and downsampling digital filters together with the analog filters, preferably, dominate over the channel itself. As such, the channel, if assumed to include the baseband-to-RF conversion along with the RF-to-baseband conversion, can be modeled as a FIR channel whose impulse response s(t) equals zero for t<0 and t≧T.

If the channel is modeled as a FIR channel, the impulse response, s(t), of the channel can be assumed to satisfy s(t)=0 for t<0 and t≧T. Because of this property and the above-described shift orthogonality property of the codes, the following proof holds, where the received waveform is $$f(t) = \sum_{n=1-K}^{N+J} a_n s(t - nT_c)$$

and the match waveform used at the receiver is:

$$g(t) = \sum_{m=1}^{N} b_m s(t - mT_c)$$

Thus, the cross correlation of the two signals is $$r(\tau) = \int_0^\infty g(t) f^*(t + \tau) dt = r_1(\tau) + r_2(\tau) + r_3(\tau)$$

where $$r_1(\tau) \equiv \sum_{m=2}^{N} \sum_{n=1-K}^{m-K-1} b_m a_n^* p(\tau + mT_c - nT_c)$$

$$r_2(\tau) \equiv \sum_{m=1}^{N} \sum_{n=m-K}^{m+J} b_m a_n^* p(\tau + mT_c - nT_c)$$

$$r_3(\tau) \equiv \sum_{m=1}^{N-1} \sum_{n=m+J+1}^{N+J} b_m a_n^* p(\tau + mT_c - nT_c)$$

where $$p(\tau) = \int_0^T s(t) s^*(t + \tau) dt$$

and p(τ)=0 for τ<−T and τ≧T.

Now, as will be obvious to one of skill in the art, $r_1(\tau)=0$ for $\tau \geq T - KT_c - T_c$ and $r_3(\tau)=0$ for $\tau \geq T_c + JT_c - T$. Furthermore, $$r_2(\tau) = \sum_{m=1}^{N} \sum_{v=-K}^{J} b_m a_{m+v}^* p(\tau - vT_c)$$

$$= \sum_{v=-K}^{J} \left[ \sum_{m=1}^{N} b_m a_{m+v}^* \right] p(\tau - vT_c)$$

and, because the shift orthogonality property ensures that the term in brackets is zero for v=−K, . . . ,J it is obvious that $r_2(\tau)=1$ for all τ. Together these statements imply that r(τ)=0 for $T-KT_c-T_c \leq \tau \leq T_c+JT_c-T$.

and we can make this orthogonality interval large simply by choosing K and J to be large.

Thus, it is possible to increase the systems tolerance for arbitrary time shifts and maintain orthogonality by simply increasing the circular padding, J and K.

Figure 20:
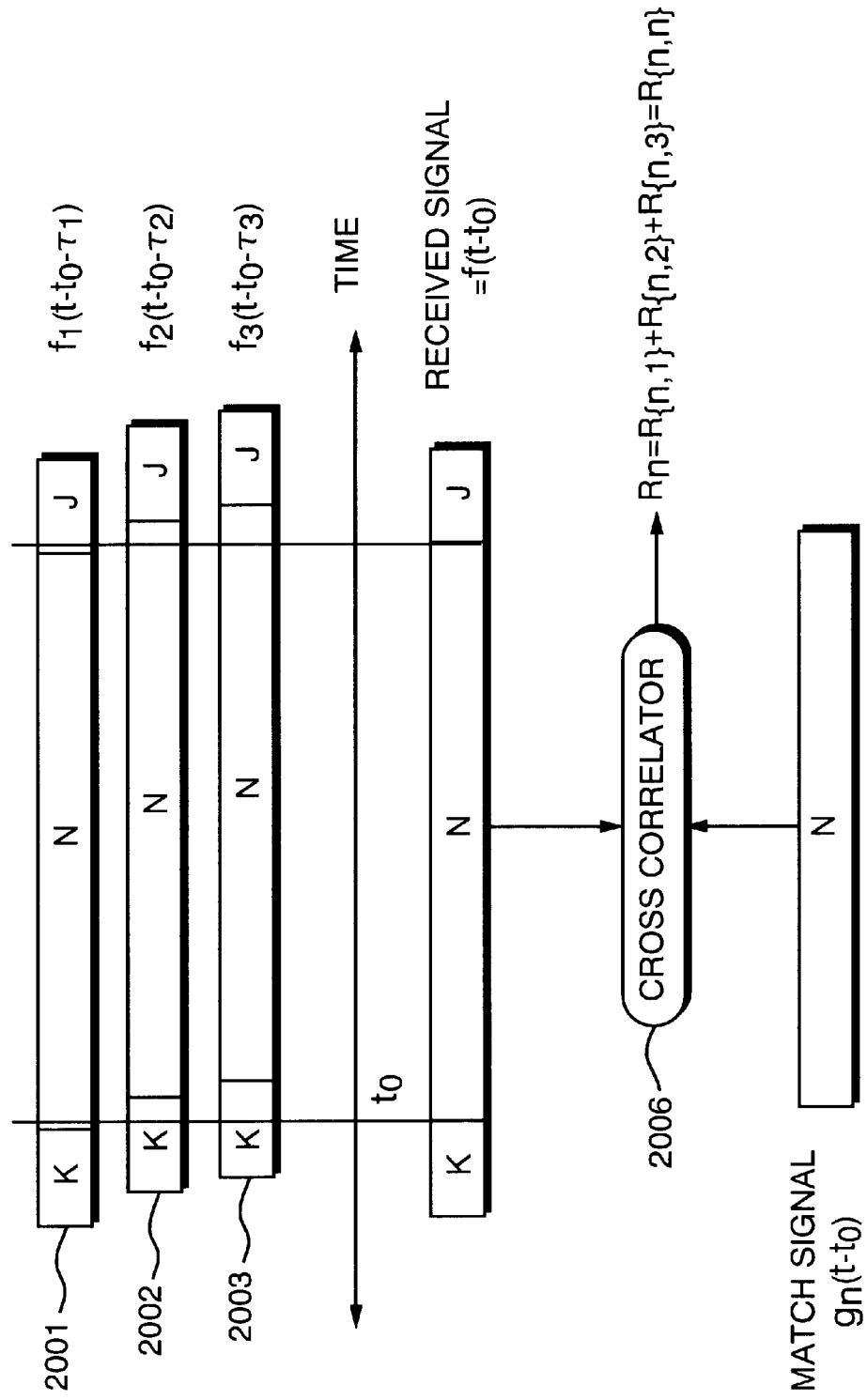
FIG. 20 provides an illustration, consistent with the invention, of correlating received signals with match waveforms.

FIG. 20 provides an illustration of correlating received signals with match waveforms for explaining how the system's increased tolerance for arbitrary, but bounded, time shifts is manifest as a practically zero mutual interference between signals from different transmitters. The figure assumes that three terminals are each assigned a single shift of the cyclically orthogonal code sequence and that these assigned shifts are separated by a minimum number of unassigned shifts, called guard codes. In this embodiment, each terminal circularly pads its assigned code to create a sequence with the above described shift-orthogonality property.

Each terminal uses its assigned circularly padded code to spread a data-symbol and then transmit the resulting spread data symbol so that it arrives at the HUB 31 at a given time, $t_0$. Thus, the spread data symbols from the three terminals arrive at the HUB 31 nearly simultaneously and are physically combined in a time-aligned fashion prior to conversion to baseband.

As illustrated in the figure, and as will be understood by one of skill in the art, although this time alignment can be achieved with reasonable precision there will always remain some small misalignment, $\tau$. Thus, as illustrated, the received baseband signal $f(t-t_0)$ is composed of several portions including a portion $f_1(t-t_0-\tau_1)$ corresponding to a spread symbol 2001 transmitted by the first terminal which has arrived at time $t_0+\tau_1$, a portion $f_2(t-t_0-\tau_2)$ corresponding to the spread symbol 2002 transmitted by the second terminal which has arrived at time $t_0+\tau_2$, and a portion $f_3(t-t_0-\tau_3)$ corresponding to the spread symbol 2003 transmitted by the third terminal which has arrived at time $t_0+\tau_3$.

To recover the information from the second terminal, the cross-correlator 2006 computes $$R_2 = \int_{t_0}^{\infty} g_2(t-t_0) f(t-t_0) dt$$

where $g_2(t)$ is the match waveform for the spread symbol 2002 transmitted by the second terminal and where $$f(t-t_0)=f_1(t-t_0-\tau_1)+f_2(t-t_0-\tau_2)+f_3(t-t_0-\tau_3)$$

This computed cross-correlation will be composed of three components $$R_2 = R_{\{2,1\}} + R_{\{2,2\}} + R_{\{2,3\}}$$

where, for k=1,2,3, these components are $$R_{\{2,k\}} = \int_{t_0}^{\infty} g_2(t-t_0) f_k(t-t_0-\tau_k) dt$$

and, because the sequence underlying $g_2(t)$ is shift-orthogonal to the sequences underlying $f_1(t)$ and $f_3(t)$, we will have $R_{\{2,1\}} = R_{\{2,3\}} = 0$ so long as the misalignments, $\tau_1$ and $\tau_3$, are within the bounds:

$$T-KT_c-T_c < \tau_1, \tau_3, < T_c+JT_c-T$$

Consequently, $R_2 = R_{\{2,2\}}$ and there is, for all practical purposes, zero interference from the first and third terminals when the HUB 31 is recovering information from second terminal. Similarly, when the receiver uses the rotating correlator to recover the information from the first terminal by computing the cross-correlation $$R_1 = R_{\{1,1\}} + R_{\{1,2\}} + R_{\{1,3\}}$$

the components from the second and third terminals, which respectively are $R_{\{1,2\}}$ and $R_{\{1,3\}}$, will be zero so long as the misalignments are within the bounds:

$$T-KT_c-T_c < \tau_2, \tau_3 < T_c+JT_c-T$$

Consequently, $R_1 = R_{\{1,1\}}$ and again there is, for all practical purposes, zero interference from the second and third terminals when the HUB 31 is recovering information from the first terminal.

Recovering the Symbols

Figure 21:
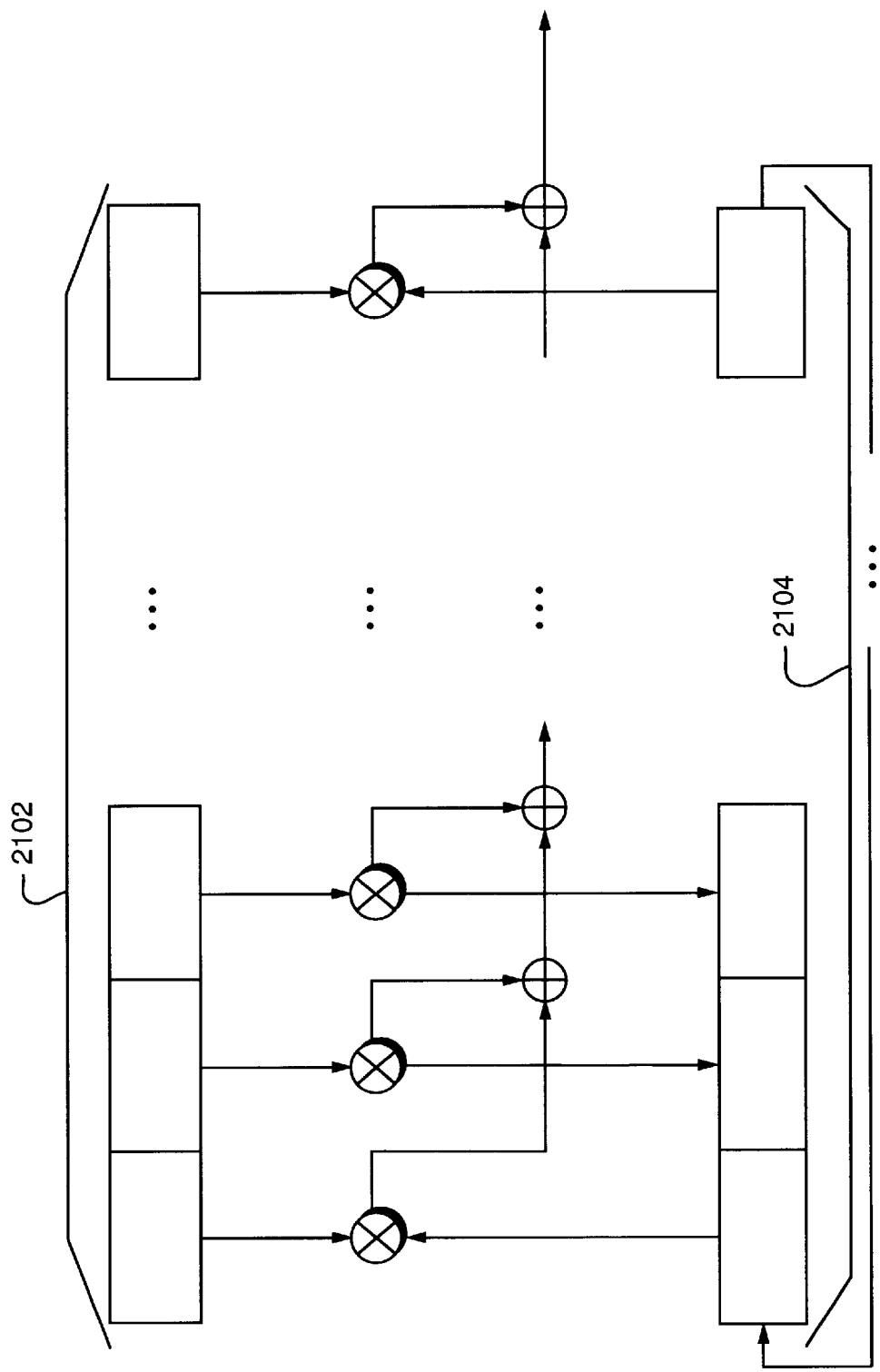
FIG. 21 illustrates a rotating correlator, consistent with the present invention.

FIG. 21 is a diagram of a rotating correlator 2100 in a receiver for despreading the received spread symbols. Because each code is a circular shift of every other code, the rotating correlator 2100 can despread a symbol that was spread by any of the codes. Thus, when receiving spread symbols from one or more terminals using multiple codes, the same rotating correlator can despread all of the received spread symbols from all of the terminals.

The rotating correlator 2100 preferably operates by shifting a sampled segment of the received baseband signal into registers 2102. This segment is then combined with a code stored in registers 2104. After which, the last element in registers 2104 is rotated to the first register of registers 2104, each element in registers 2104 is then shifted by one register, and the segment stored in registers 2102 is again combined with the now circularly-shifted code stored in registers 2104. Through this mechanism the segment stored in registers 2102 may be correlated with any or all circular shifts of the code, so the proper shifts can be determined and the received spread symbol can be despread.

In another embodiment, a Fast Fourier Transform (FFT) may be used to despread the received baseband signal segment. This despreading is accomplished by combining the N samples of the received signal segment with N stored values, designated $\tilde{c}_n$ for n=1, 2, ..., N. Preferably, $\tilde{c}_n$ is a previously computed length-N FFT of the base code of the cyclically orthogonal family of codes. This combining process is accomplished in three steps:

1. The length-N FFT of the N received signal samples is computed, thereby generating N transformed signal samples designated $\tilde{r}_n$ for n=1, 2, ..., N.

2. Each transformed signal sample, $\tilde{r}_n$, is multiplied by its corresponding stored value, $\tilde{c}_n$, thereby generating N transformed despread values, $\tilde{e}_n = \tilde{r}_n \tilde{c}_n$ for n=1, 2, ..., N, and 3. The length-N inverse FFT of the N transformed despread values is computed thereby generating N despread values, $e_n$ for n=1, 2, ..., N.

As will be obvious to one of skill in the art, the above process computes all N values of the circular correlation of the base code sequence with the N samples of the received signal segment.

In addition, as will be understood by one of skill in the art, the direct circular correlation performed by the rotating correlator may be less costly and thereby preferred to the transform domain circular correlation performed by the above-described process using FFT's in certain circumstances. For example, when the circular correlation requires only a small number of values or when the elements of the code sequence can be represented by a small number of bits, permitting the rotating correlator to use low-cost specially designed hardware multipliers, it may be less costly to use a rotating correlator. Thus, a rotating correlator may be preferred for terminals assigned a small number of code shifts or for terminals using a ternary code sequence.

As will also be understood by one of skill in the art, the transform domain circular correlation process may be less costly and thereby preferred to the rotating correlator when a large number of values of the circular correlation are required or when the elements of the code sequence cannot be readily represented by a small number of bits. Thus, for example, the transform domain circular correlation process may be preferred for despreading the signal in a hub, in a terminal that has been assigned a large number of code shifts, or in the case that the base code sequence is a row of a circulant-unitary matrix.

Another embodiment of the invention incorporates both the rotating correlator and the transform domain circular correlation process as software elements and selects the despreading technique that requires less computational resources for the circular correlation. Thus, for example, in a terminal that may be assigned a small number of code shifts at one point in time but may be assigned a large number of code shifts at another point in time, the terminal may select to use the rotating correlator at some times and the transform domain circular correlation process at other times to help minimize the cost of the computational resources required by the terminal or to best utilize the available computational resources of the terminal.

As will be understood by one of skill in the art, the FFT is just one example of a transform with the circular correlation property and that other transforms with the circular correlation property, such as Number Theoretic Transforms (NTT) or Van Der Monde Transforms, may be used to implement the transform domain circular correlation process.

In addition to signal recovery, as will be obvious to one of skill in the art, both the above described rotating correlator and FFT transform domain circular correlation process can be used at the transmitter for spreading the signals While it has been illustrated and described what is at present considered to be the preferred embodiment and methods of the present invention, it will be understood by those skilled in the art that various changes and modifications may be made, and equivalents may be substituted for elements thereof without departing from the true scope of the invention.

In addition, many modifications may be made to adapt a particular element, technique or, implementation to the teachings of the present invention without departing from the central scope of the invention. Therefore, it is intended that this invention not be limited to the particular embodiment and methods disclosed herein, but that the invention includes all embodiments falling within the scope of the appended claims.

What is claimed is:

1. A method for communicating over a network having a plurality of nodes comprising the steps of:

generating a plurality of cyclically orthogonal codes, each code being orthogonal and a circularly shifted version of every other one of the cyclically orthogonal codes, and each having an equal number of chips;

generating a set of one or more transmit codes from one or more of the cyclically orthogonal codes, wherein the transmit codes have a greater number of chips than the cyclically orthogonal codes;

generating a plurality of match codes, wherein each transmit code is orthogonal to a first subset of the plurality of match codes and is not orthogonal to a first remainder of the plurality excluding the first subset, and wherein a shift of the transmit code by a predetermined number of chips is orthogonal to a second subset of the plurality of match codes and is not orthogonal to a second remainder of the plurality excluding the second subset;

assigning the set of transmit codes to a first node; and transmitting information from the first node to a second node using the set of transmit codes such that the information may be recovered using one or more of the match codes.

2. The method of claim 1, wherein each of the cyclically orthogonal codes is derived from a ternary sequence.

3. The method of claim 1, wherein each of the cyclically orthogonal codes is derived from a row of a circulant-unitary matrix.

4. The method of claim 1, wherein each of the cyclically orthogonal codes is derived from a scaled version of a row of a circulant-unitary matrix.

5. The method of claim 1, wherein the transmitting step includes the substeps of:

modulating the information using a first modulation;

combining the modulated information with one of the transmit codes in the set of transmit codes; and sending the modulated information combined with the transmit code to the second node.

6. The method of claim 5, wherein the first modulation is a Quadrature Amplitude Modulation.

7. The method of claim 5, wherein the first modulation is a Phase Shift Keying modulation.

8. The method of claim 5, wherein each of the cyclically orthogonal codes is derived from a ternary sequence.

9. The method of claim 5, wherein each of the cyclically orthogonal codes is derived from a row of a circulant-unitary matrix.

10. The method of claim 1, further comprising the steps of:

determining a set of constellations, each of the constellations include a collection of symbols; and selecting a constellation within the set of constellations;

wherein the step of transmitting the information includes using the selected constellation to transmit the information.

11. The method of claim 10, wherein the selecting step includes the substep of chosing a constellation based on a Quality of Service for the information.

12. The method of claim 11, further comprising the steps of:

selecting a power level for transmitting the information based on the Quality of Service for the information; and wherein the step of transmitting the information includes the substep of
    using the selected power level to transmit the information.

13. The method of claim 1, wherein the step of transmitting the information includes the substep of:

channel pre-coding the information prior to transmitting the information to the second node.

14. The method of claim 1, wherein the step of transmitting the information includes the substep of:

encoding the information using forward error correction encoding.

15. The method of claim 14, wherein the encoding step includes the substep of
    using Reed-Solomon encoding to encode the information.

16. The method of claim 14, wherein the encoding step includes the substep of
    using Turbo encoding to encode the information.

17. The method of claim 1, wherein the step of transmitting the information includes the substeps of:

generating a container including a payload for transmitting user information and a header for transmitting overhead information; and transmitting the container from the first node to the second node.

18. The method of claim 17, further comprising the steps of:

determining a set of constellations, each constellation including a collection of symbols; and selecting a constellation within the set of constellations for each container to be transmitted; and wherein the substep of transmitting the container includes the substep of using the selected constellation to transmit the information; and wherein different constellations are used for transmitting different containers.

19. The method of claim 17, wherein the step of transmitting the information includes the substep of:
    encoding the information using forward error correction encoding.

20. The method of claim 19, wherein the type of forward error correction used is variable for different containers.

21. The method of claim 17, wherein the header includes sequences to facilitate one of channel measurements, timing recovery, and packet reassembly.

22. The method of claim 1, wherein the step of transmitting the information includes the substeps of:
    selecting a transmit code from the set of transmit codes;
    generating a spread signal using the selected code by performing a fast fourier transform; and
    transmitting the generated spread signal.

23. The method of claim 1, further comprising the steps of:
    receiving the transmitted information at the second node; and
    generating a despread signal at the second node using a fast fourier transform.

24. The method of claim 1, wherein each of the cyclically orthogonal codes includes a plurality of chips and includes a beginning and an end, wherein the step of generating the set of transmit codes includes the steps of:
    selecting a cyclically orthogonal code from the plurality of cyclically orthogonal codes; and
    generating a transmit code including a plurality of chips using the selected cyclically orthogonal code, the transmit code includes a beginning, a middle, and an end, the beginning of the transmit code includes a plurality of chips from the end of the selected cyclically orthogonal code, the middle of the transmit code includes the selected cyclically orthogonal code, and the end of the transmit code includes a plurality of chips from the beginning of the selected cyclically orthogonal code.

25. The method of claim 1, further comprising steps of
    generating a plurality of header bits;
    generating a plurality of payload bits;
    modulating the header bits with a first modulation; and
    modulating the payload bits with a second modulation;
    wherein the step of transmitting the information includes the substeps of
    transmitting the modulated header bits, and
    transmitting the modulated payload bits.

26. The method of claim 25, wherein the first modulation is a Phase Shift Keying modulation.

27. The method of claim 25, wherein the second modulation is a Quadrature Amplitude Modulation.

28. The method of claim 25, wherein the second modulation is a Phase Shift Keying modulation.

29. A node for communicating over a network, comprising:
    means for storing a subset of transmit codes, the subset of transmit codes being derived from a set of cyclically orthogonal codes in which each cyclically orthogonal code in the set of cyclically orthogonal codes is orthogonal to and a circularly shifted version of every other one of the cyclically orthogonal codes in the set of cyclically orthogonal codes, and wherein a transmit code has a greater number of chips than a cyclically orthogonal code; and
    means for transmitting information using the subset of transmit codes, wherein the transmitted information can be recovered using one of a plurality of match codes, and wherein each transmit code is orthogonal to a first subset of the plurality of match codes and is not orthogonal to a first remainder of the plurality excluding the first subset, and wherein a shift of the transmit code by a predetermined number of chips is orthogonal to a second subset of the plurality of match codes and is not orthogonal to a second remainder of the plurality excluding the second subset.

30. The node of claim 29, wherein each of the cyclically orthogonal codes is derived from a ternary sequence.

31. The node of claim 29, wherein each of the cyclically orthogonal codes is derived from a row of a circulant-unitary matrix.

32. The node of claim 29, wherein each of the cyclically orthogonal codes is derived from a scaled version of a row of a circulant-unitary matrix.

33. The node of claim 29, wherein the means for transmitting the information includes:
    means for modulating the information using a first modulation;
    means for combining the modulated information with one of the transmit codes in the subset of transmit codes; and
    means for transmitting the modulated information combined with the transmit code to the second node.

34. The node of claim 33, wherein the first modulation is a Quadrature Amplitude Modulation.

35. The node of claim 33, wherein the first modulation is a Phase Shift Keying modulation.

36. The node of claim 33, wherein each of the cyclically orthogonal codes is derived from a ternary sequence.

37. The node of claim 33, wherein each of the cyclically orthogonal codes is derived from a row of a circulant-unitary matrix.

38. The node of claim 29 further comprising:
    means for selecting a constellation within a set of constellations, each of the constellations including a collection of symbols;
    wherein the means for transmitting the information includes using the selected constellation to transmit the information.

39. The node of claim 38, wherein the constellation is selected based on a Quality of Service for the information.

40. The node of claim 39, further comprising
    means for selecting a power level for transmitting the information based on the Quality of Service for the information;
    wherein the means for transmitting the information includes means for using the selected power level to transmit the information.

41. The node of claim 29, wherein the means for transmitting the information includes:
    means for channel pre-coding the information prior to transmitting the information to the second node.

42. The node of claim 29, wherein the means for transmitting the information includes:
    means for encoding the information using forward error correction encoding.

43. The node of claim 42, wherein the means for encoding the information includes means for encoding the information using Reed-Solomon encoding.

44. The node of claim 42, wherein the means for encoding the information includes means for encoding the information using Turbo encoding.

45. The node of claim 29, further comprising means for generating a container including a payload for transmitting user information and a header for transmitting overhead information;

wherein the means for transmitting the information includes means for transmitting the container.

46. The node of claim 45, further comprising means for selecting a constellation within a set of constellations each constellation including a collection of symbols;

wherein the means for transmitting the container includes means for using the selected constellation; and wherein different constellations may be used for transmitting different containers.

47. The node of claim 45, wherein the means for transmitting the information includes means for encoding the information using forward error correction encoding.

48. The node of claim 45, wherein the type of forward error correction used varies for different containers.

49. The node of claim 45, wherein the header includes sequences to facilitate one of channel measurements, timing recovery, and packet reassembly.

50. The node of claim 29, wherein the means for transmitting the information includes:

means for selecting a transmit code from the subset of transmit codes;

means for generating a spread signal using the selected transmit code by performing a fast fourier transform; and means for transmitting the generated spread signal.

51. The node of claim 29, further comprising means for receiving information transmitted by the second node; and means for generating a despread signal using a fast fourier transform.

52. The node of claim 29, wherein each of the plurality of cyclically orthogonal codes includes a plurality of chips and includes a beginning and an end, wherein the means for transmitting includes means for using a transmit code, including a plurality of chips, for transmitting the information, wherein the transmit code includes a beginning, a middle, and an end, and wherein beginning of the transmit code includes a plurality of chips from the end of a cyclically orthogonal code selected from the plurality of cyclically orthogonal codes, the middle of the transmit code includes the selected cyclically orthogonal code, and the end of the transmit code includes a plurality of chips from the beginning of the selected cyclically orthogonal code.

53. The node of claim 29, further comprising means for generating a plurality of header bits;

means for generating a plurality of payload bits;

means for modulating the header bits with a first modulation; and means for modulating the payload bits with a second modulation;

wherein the means for transmitting the information includes means for transmitting the modulated header bits, and means for transmitting the modulated payload bits.

54. The node of claim 53, wherein the first modulation is Phase Shift Key.

55. The node of claim 53, wherein the second modulation is a Quadrature Amplitude Modulation.

56. The node of claim 53, wherein the second modulation is a Phase Shift Keying modulation.

57. A method for communicating over a network having a plurality of nodes, comprising the steps of:

generating a circulant-unitary matrix having a plurality of rows;

selecting a row including a plurality of elements from the circulant-unitary matrix, the row having a beginning and an end;

generating a circularly padded code using the selected row, the circularly padded code including a beginning, a middle, and an end, the beginning of the circularly padded code includes a plurality of elements from the end of the selected row, the middle of the circularly padded code includes the selected row; and the end of the circularly padded code includes a plurality of elements from the beginning of the selected row; and transmitting information using the circularly padded code from a first node to a second node using a row of the circulant-unitary matrix.

58. The method of claim 57, further comprising:

receiving the transmitted information at the second node; and recovering the information at the second node using a fast fourier transform.

59. The method of claim 57, wherein the step of transmitting the information includes the substep of:

combining the row of the circulant-unitary matrix with the information using a fast fourier transform.

60. A node for communicating over a network having a plurality of nodes, comprising:

means for storing a row of a circulant-unitary matrix wherein each row includes a plurality of elements and includes a beginning and an end; and means, using a circularly padded code, for transmitting information from the node to a second node using the stored row;

wherein the circularly padded code includes a beginning, a middle, and an end, the beginning of the circularly padded code includes a plurality of elements from the end of a row selected from the circulant-unitary matrix, the middle of the circularly padded code includes the selected row; and the end of the circularly padded code includes a plurality of elements from the beginning of the selected row.

61. The node of claim 60, further comprising means for receiving a signal transmitted by the second node;

means for recovering information from the received signal using a fast fourier transform.

62. The node of claim 60, further comprising means for combining the row of the circulant-unitary matrix with the information using a fast fourier transform.

63. A method for communicating over a network having a plurality of nodes comprising the steps of:

generating a plurality of cyclically orthogonal codes, each cyclically orthogonal code being orthogonal and a circularly shifted version of every other one of the cyclically orthogonal codes, and each having an equal number of chips;

generating a set of one or more transmit codes from one or more of the cyclically orthogonal codes, wherein the transmit codes have a greater number of chips than the cyclically orthogonal codes;

generating a plurality of match codes, wherein each transmit code is orthogonal to a first subset of the plurality of match codes and is not orthogonal to a first remainder of the plurality excluding the first subset, and wherein a shift of the transmit code by a predetermined number of chips is orthogonal to a second subset of the plurality of match codes and is not orthogonal to a second remainder of the plurality excluding the second subset;

storing the match codes in a first node;

receiving information transmitted from a second node to the first node using the set of transmit codes; and recovering the transmitted information using one or more of the match codes.

64. A node for communicating over a network, comprising:

means for storing a plurality of match codes, means for receiving information transmitted from a second node using a transmit code, wherein the transmit code is derived from a set of cyclically orthogonal codes in which each cyclically orthogonal code in the set of cyclically orthogonal codes is orthogonal to and a circularly shifted version of every other one of the cyclically orthogonal codes in the set of cyclically orthogonal codes, and wherein the transmit code has a greater number of chips than a cyclically orthogonal code in the set of cyclically orthogonal codes; and means for recovering the transmitted information using one or more of the match codes, wherein the transmit code is orthogonal to a plurality of the match codes and is not orthogonal to one of the match codes, and wherein a shift of the transmit code by a predetermined number of chips is orthogonal to a plurality of the match codes and is not orthogonal to a different one of the match codes.

65. A method for communicating between a first node and a second node, comprising the steps of:

generating a plurality of match codes, each of the match codes including an equal number of chips;

generating a plurality of transmit codes, each of the transmit codes including a greater number of chips than the number of chips in each match code, each transmit code includes a plurality of subcodes, each subcode includes a plurality of chips equal in number to the number of chips in each match code, and each subcode is orthogonal to all but one of the match codes;

assigning one of the transmit codes to the first node; and transmitting information from the first node to the second node using the assigned transmit code.

66. The method of claim 65, further comprising generating a second plurality of match codes, each of the match codes including an equal number of chips to the number of chips in each match code in the first plurality of match codes;

generating a second plurality of transmit codes, each of the transmit codes including a greater number of chips than the number of chips in each match code, each transmit code in the second plurality of transmit codes includes a plurality of subcodes, each subcode in each transmit code in the second plurality of transmit codes includes a plurality of chips equal in number to the number of chips in each match code, each subcode in each transmit code in the second plurality of transmit codes is orthogonal to all but one of the match codes in the second plurality of match codes, and each subcode in each transmit code in the second plurality of transmit codes is orthogonal to each of the match codes in the first plurality of match codes;

assigning a transmit code from the second plurality of transmit codes to a third node; and transmitting information from the third node to the second node using the assigned transmit code.

67. The method of claim 65, wherein each of the transmit codes is derived from a match code.

* * * * *